(12) United States Patent
Nakayama et al.

(10) Patent No.: US 8,274,182 B2
(45) Date of Patent: Sep. 25, 2012

(54) LINEAR MOTOR INCLUDING EXTENDED TOOTH TIPS

(75) Inventors: Misa Nakayama, Tokyo (JP); Shinichi Yamaguchi, Tokyo (JP); Koki Naka, Tokyo (JP); Kazumasa Ito, Tokyo (JP); Toshinori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 12/679,803

(22) PCT Filed: Sep. 30, 2008

(86) PCT No.: PCT/JP2008/067769
§ 371 (c)(1), (2), (4) Date: Mar. 24, 2010

(87) PCT Pub. No.: WO2009/044748
PCT Pub. Date: Apr. 9, 2009

(65) Prior Publication Data
US 2010/0201210 A1    Aug. 12, 2010

(30) Foreign Application Priority Data

Oct. 4, 2007 (JP) ................................. 2007-260854
Feb. 8, 2008 (JP) ................................. 2008-028778

(51) Int. Cl.
H02K 41/02    (2006.01)
H02K 41/03    (2006.01)

(52) U.S. Cl. ............... 310/12.25; 310/12.26; 310/12.24; 310/216.072; 310/216.073; 310/216.096; 310/216.097; 310/216.031; 310/216.025; 310/216.011; 310/269

(58) Field of Classification Search .... 310/12.01–12.33, 310/216.072, 216.073, 216.096, 216.097, 310/216.031, 216.025, 269; H02K 41/02, 41/03

See application file for complete search history.

(56) References Cited

U.S. PATENT DOCUMENTS 4,390,307 A * 6/1983 Rice .............................. 405/228
(Continued)

FOREIGN PATENT DOCUMENTS

JP    6 29353    4/1994
(Continued)

OTHER PUBLICATIONS

Machine translation of JP2002136003, Oct. 2000, Daikoku et al.*
(Continued)

*Primary Examiner* — Quyen Leung
*Assistant Examiner* — Terrance Kenerly
(74) *Attorney, Agent, or Firm* — Oblon, Spivak, McClelland, Maier & Neustadt, L.L.P.

(57) ABSTRACT

A linear motor includes a stator having field poles arranged linearly with opposing polarities arranged in an alternating manner; and a rotor having an armature core with teeth that faces a pole face of the field poles with a gap, and coils wound around the teeth. The stator and the rotor are supported in a slidable manner, a direction perpendicular to a sliding direction of the rotor and in parallel with the pole face is defined as a stacking direction. A head of each of the teeth has an extended portion extended in the sliding direction. At least heads of the teeth arranged at both ends of the armature core along the sliding direction is divided into a plurality of areas along the stacking direction. At least one of extended portions arranged on adjacent areas is extended by a different length along the sliding direction.

10 Claims, 21 Drawing Sheets

U.S. PATENT DOCUMENTS

| | | | |
|---|---|---|---|
| 5,910,691 A * | 6/1999 | Wavre | 310/12.18 |
| 6,791,214 B2 * | 9/2004 | Korenaga | 310/12.26 |
| 6,853,105 B2 * | 2/2005 | Nakano et al. | 310/156.47 |
| 7,067,948 B2 | 6/2006 | Yamaguchi et al. | |
| 7,196,445 B2 | 3/2007 | Yamaguchi et al. | |
| 7,342,338 B2 * | 3/2008 | Miyazaki et al. | 310/156.47 |
| 7,642,685 B2 | 1/2010 | Nakayama et al. | |
| 2006/0244335 A1 * | 11/2006 | Miyazaki et al. | 310/216 |
| 2006/0244337 A1 * | 11/2006 | Makita et al. | 310/257 |
| 2007/0024145 A1 * | 2/2007 | Makita et al. | 310/159 |

FOREIGN PATENT DOCUMENTS

| | | |
|---|---|---|
| JP | 11 262236 | 9/1999 |
| JP | 2002 136003 | 5/2002 |
| JP | 2003 18802 | 1/2003 |
| JP | 2003 134790 | 5/2003 |
| JP | 2003 299342 | 10/2003 |
| JP | 2007 60800 | 3/2007 |
| JP | 2007 185033 | 7/2007 |
| WO | 2007 086312 | 8/2007 |

OTHER PUBLICATIONS

Machine translation of JP2006000984, Jan. 2006, Yamashiro et al.*

U.S. Appl. No. 12/810,526, filed Jun. 25, 2010, Yamaguchi, et al.

* cited by examiner

FIG.3

TABLE 1. THEORETICAL EFFECTS OF STEPWISE SKEW

| ORDER | STEPWISE SKEW ANGLE [°] | | | | | |
|---|---|---|---|---|---|---|
| | 5 | 10 | 15 | 20 | 25 | 30 |
| 2 | 0.996 | 0.985 | 0.966 | 0.940 | 0.906 | 0.866 |
| 4 | 0.985 | 0.940 | 0.866 | 0.766 | 0.643 | 0.500 |
| 6 | 0.966 | 0.866 | 0.707 | 0.500 | 0.259 | 0.000 |
| 8 | 0.940 | 0.766 | 0.500 | 0.174 | −0.174 | −0.500 |
| 10 | 0.906 | 0.643 | 0.259 | −0.174 | −0.574 | −0.866 |
| 12 | 0.866 | 0.500 | 0.000 | −0.500 | −0.866 | −1.000 |
| 14 | 0.819 | 0.342 | −0.259 | −0.766 | −0.996 | −0.866 |
| 16 | 0.766 | 0.174 | −0.500 | −0.940 | −0.940 | −0.500 |

| ORDER | STEPWISE SKEW ANGLE [°] | | | | | |
|---|---|---|---|---|---|---|
| | 35 | 40 | 45 | 50 | 55 | 60 |
| 2 | 0.819 | 0.766 | 0.707 | 0.643 | 0.574 | 0.500 |
| 4 | 0.342 | 0.174 | 0.000 | −0.174 | −0.342 | −0.500 |
| 6 | −0.259 | −0.500 | −0.707 | −0.866 | −0.966 | −1.000 |
| 8 | −0.766 | −0.940 | −1.000 | −0.940 | −0.766 | −0.500 |
| 10 | −0.996 | −0.940 | −0.707 | −0.342 | 0.087 | 0.500 |
| 12 | −0.866 | −0.500 | 0.000 | 0.500 | 0.866 | 1.000 |
| 14 | −0.423 | 0.174 | 0.707 | 0.985 | 0.906 | 0.500 |
| 16 | 0.174 | 0.766 | 1.000 | 0.766 | 0.174 | −0.500 |

| ORDER | STEPWISE SKEW ANGLE [°] | | | | | |
|---|---|---|---|---|---|---|
| | 65 | 70 | 75 | 80 | 85 | 90 |
| 2 | 0.423 | 0.342 | 0.259 | 0.174 | 0.087 | 0.000 |
| 4 | −0.643 | −0.766 | −0.866 | −0.940 | −0.985 | −1.000 |
| 6 | −0.966 | −0.866 | −0.707 | −0.500 | −0.259 | 0.000 |
| 8 | −0.174 | 0.174 | 0.500 | 0.766 | 0.940 | 1.000 |
| 10 | 0.819 | 0.985 | 0.966 | 0.766 | 0.423 | 0.000 |
| 12 | 0.866 | 0.500 | 0.000 | −0.500 | −0.866 | −1.000 |
| 14 | −0.087 | −0.643 | −0.966 | −0.940 | −0.574 | 0.000 |
| 16 | −0.940 | −0.940 | −0.500 | 0.174 | 0.766 | 1.000 |

FIG.23

TABLE 2. THEORETICAL EFFECTS OF 3 STEPWISE SKEW (EQUALLY SPACED)

| ORDER | STEPWISE SKEW ANGLE [°] | | | | | |
|---|---|---|---|---|---|---|
| | 0.0 | 5.00 | 10.0 | 15.0 | 20.0 | 25.0 |
| 1 | 1.000 | 0.999 | 0.997 | 0.994 | 0.990 | 0.984 |
| 2 | 1.000 | 0.997 | 0.990 | 0.977 | 0.960 | 0.938 |
| 4 | 1.000 | 0.990 | 0.960 | 0.911 | 0.844 | 0.762 |
| 6 | 1.000 | 0.977 | 0.911 | 0.805 | 0.667 | 0.506 |
| 8 | 1.000 | 0.960 | 0.844 | 0.667 | 0.449 | 0.218 |
| 10 | 1.000 | 0.938 | 0.762 | 0.506 | 0.218 | −0.049 |
| 12 | 1.000 | 0.911 | 0.667 | 0.333 | 0.000 | −0.244 |
| 14 | 1.000 | 0.879 | 0.561 | 0.161 | −0.177 | −0.331 |
| 16 | 1.000 | 0.844 | 0.449 | 0.000 | −0.293 | −0.293 |

| ORDER | STEPWISE SKEW ANGLE [°] | | | | | |
|---|---|---|---|---|---|---|
| | 30.0 | 35.0 | 40.0 | 45.0 | 50.0 | 55.0 |
| 1 | 0.977 | 0.969 | 0.960 | 0.949 | 0.938 | 0.925 |
| 2 | 0.911 | 0.879 | 0.844 | 0.805 | 0.762 | 0.716 |
| 4 | 0.667 | 0.561 | 0.449 | 0.333 | 0.218 | 0.105 |
| 6 | 0.333 | 0.161 | 0.000 | −0.138 | −0.244 | −0.311 |
| 8 | 0.000 | −0.177 | −0.293 | −0.333 | −0.293 | −0.177 |
| 10 | −0.244 | −0.331 | −0.293 | −0.138 | 0.105 | 0.391 |
| 12 | −0.333 | −0.244 | 0.000 | 0.333 | 0.667 | 0.911 |
| 14 | −0.244 | 0.052 | 0.449 | 0.805 | 0.990 | 0.938 |
| 16 | 0.000 | 0.449 | 0.844 | 1.000 | 0.844 | 0.449 |

| ORDER | STEPWISE SKEW ANGLE [°] | | | | | |
|---|---|---|---|---|---|---|
| | 60.0 | 65.0 | 70.0 | 75.0 | 80.0 | 85.0 |
| 1 | 0.911 | 0.896 | 0.879 | 0.862 | 0.844 | 0.825 |
| 2 | 0.667 | 0.615 | 0.561 | 0.506 | 0.449 | 0.391 |
| 4 | 0.000 | −0.095 | −0.177 | −0.244 | −0.293 | −0.323 |
| 6 | −0.333 | −0.311 | −0.244 | −0.138 | 0.000 | 0.161 |
| 8 | 0.000 | 0.218 | 0.449 | 0.667 | 0.844 | 0.960 |
| 10 | 0.667 | 0.879 | 0.990 | 0.977 | 0.844 | 0.615 |
| 12 | 1.000 | 0.911 | 0.667 | 0.333 | 0.000 | −0.244 |
| 14 | 0.667 | 0.275 | −0.095 | −0.311 | −0.293 | −0.049 |
| 16 | 0.000 | −0.293 | −0.293 | 0.000 | 0.449 | 0.844 |

FIG.26

TABLE 3. THEORETICAL EFFECTS OF 4 STEPWISE SKEW (EQUALLY SPACED)

| ORDER | STEPWISE SKEW ANGLE [°] | | | | | |
|---|---|---|---|---|---|---|
| | 0.0 | 5.00 | 10.0 | 15.0 | 22.5 | 25.0 |
| 1 | 1.000 | 0.999 | 0.998 | 0.995 | 0.989 | 0.987 |
| 2 | 1.000 | 0.998 | 0.992 | 0.981 | 0.958 | 0.948 |
| 4 | 1.000 | 0.992 | 0.966 | 0.925 | 0.837 | 0.800 |
| 6 | 1.000 | 0.981 | 0.925 | 0.837 | 0.653 | 0.583 |
| 8 | 1.000 | 0.966 | 0.870 | 0.720 | 0.433 | 0.331 |
| 10 | 1.000 | 0.948 | 0.800 | 0.583 | 0.205 | 0.087 |
| 12 | 1.000 | 0.925 | 0.720 | 0.433 | 0.000 | -0.112 |
| 14 | 1.000 | 0.899 | 0.630 | 0.280 | -0.158 | -0.236 |
| 16 | 1.000 | 0.870 | 0.534 | 0.133 | -0.250 | -0.272 |

| ORDER | STEPWISE SKEW ANGLE [°] | | | | | |
|---|---|---|---|---|---|---|
| | 30.0 | 35.0 | 40.0 | 45.0 | 50.0 | 55.0 |
| 1 | 0.981 | 0.974 | 0.966 | 0.958 | 0.948 | 0.937 |
| 2 | 0.925 | 0.899 | 0.870 | 0.837 | 0.800 | 0.761 |
| 4 | 0.720 | 0.630 | 0.534 | 0.433 | 0.331 | 0.230 |
| 6 | 0.433 | 0.280 | 0.133 | 0.000 | -0.112 | -0.196 |
| 8 | 0.133 | -0.040 | -0.171 | -0.250 | -0.272 | -0.240 |
| 10 | -0.112 | -0.236 | -0.272 | -0.224 | -0.113 | 0.029 |
| 12 | -0.250 | -0.262 | -0.163 | 0.000 | 0.163 | 0.262 |
| 14 | -0.262 | -0.139 | 0.058 | 0.224 | 0.268 | 0.143 |
| 16 | -0.163 | 0.058 | 0.240 | 0.250 | 0.040 | -0.331 |

| ORDER | STEPWISE SKEW ANGLE [°] | | | | | |
|---|---|---|---|---|---|---|
| | 60.0 | 65.0 | 70.0 | 75.0 | 80.0 | 85.0 |
| 1 | 0.925 | 0.913 | 0.899 | 0.885 | 0.870 | 0.853 |
| 2 | 0.720 | 0.676 | 0.630 | 0.583 | 0.534 | 0.484 |
| 4 | 0.133 | 0.042 | -0.040 | -0.112 | -0.171 | -0.218 |
| 6 | -0.250 | -0.272 | -0.262 | -0.224 | -0.163 | -0.086 |
| 8 | -0.163 | -0.058 | 0.058 | 0.163 | 0.240 | 0.272 |
| 10 | 0.163 | 0.252 | 0.268 | 0.196 | 0.040 | -0.181 |
| 12 | 0.250 | 0.112 | -0.133 | -0.433 | -0.720 | -0.925 |
| 14 | -0.133 | -0.484 | -0.800 | -0.981 | -0.966 | -0.761 |
| 16 | -0.720 | -0.966 | -0.966 | -0.720 | -0.331 | 0.040 |

FIG.28

TABLE 4. THEORETICAL EFFECTS OF SLANTED SKEW

| ORDER | SLANTED SKEW ANGLE [°] | | | | | |
|---|---|---|---|---|---|---|
| | 0.0 | 5.00 | 10.0 | 15.0 | 22.5 | 25.0 |
| 1 | 1.000 | 1.000 | 0.999 | 0.997 | 0.994 | 0.992 |
| 2 | 1.000 | 0.999 | 0.995 | 0.989 | 0.974 | 0.969 |
| 4 | 1.000 | 0.995 | 0.980 | 0.955 | 0.900 | 0.878 |
| 6 | 1.000 | 0.989 | 0.955 | 0.900 | 0.784 | 0.738 |
| 8 | 1.000 | 0.980 | 0.921 | 0.827 | 0.637 | 0.564 |
| 10 | 1.000 | 0.969 | 0.878 | 0.738 | 0.471 | 0.375 |
| 12 | 1.000 | 0.955 | 0.827 | 0.637 | 0.300 | 0.191 |
| 14 | 1.000 | 0.939 | 0.769 | 0.527 | 0.139 | 0.029 |
| 16 | 1.000 | 0.921 | 0.705 | 0.413 | 0.000 | -0.098 |

| ORDER | SLANTED SKEW ANGLE [°] | | | | | |
|---|---|---|---|---|---|---|
| | 30.0 | 35.0 | 40.0 | 45.0 | 50.0 | 55.0 |
| 1 | 0.989 | 0.985 | 0.980 | 0.974 | 0.969 | 0.962 |
| 2 | 0.955 | 0.939 | 0.921 | 0.900 | 0.878 | 0.853 |
| 4 | 0.827 | 0.769 | 0.705 | 0.637 | 0.564 | 0.489 |
| 6 | 0.637 | 0.527 | 0.413 | 0.300 | 0.191 | 0.090 |
| 8 | 0.413 | 0.263 | 0.122 | 0.000 | -0.098 | -0.167 |
| 10 | 0.191 | 0.029 | -0.098 | -0.180 | -0.215 | -0.208 |
| 12 | 0.000 | -0.136 | -0.207 | -0.212 | -0.165 | -0.087 |
| 14 | -0.136 | -0.212 | -0.202 | -0.129 | -0.028 | 0.063 |
| 16 | -0.207 | -0.202 | -0.115 | 0.000 | 0.092 | 0.128 |

| ORDER | SLANTED SKEW ANGLE [°] | | | | | |
|---|---|---|---|---|---|---|
| | 60.0 | 65.0 | 70.0 | 75.0 | 80.0 | 85.0 |
| 1 | 0.955 | 0.947 | 0.939 | 0.930 | 0.921 | 0.911 |
| 2 | 0.827 | 0.799 | 0.769 | 0.738 | 0.705 | 0.672 |
| 4 | 0.413 | 0.338 | 0.263 | 0.191 | 0.122 | 0.059 |
| 6 | 0.000 | -0.076 | -0.136 | -0.180 | -0.207 | -0.217 |
| 8 | -0.207 | -0.217 | -0.202 | -0.165 | -0.115 | -0.058 |
| 10 | -0.165 | -0.101 | -0.028 | 0.040 | 0.092 | 0.122 |
| 12 | 0.000 | 0.073 | 0.118 | 0.127 | 0.103 | 0.056 |
| 14 | 0.118 | 0.125 | 0.090 | 0.028 | -0.035 | -0.079 |
| 16 | 0.103 | 0.038 | -0.035 | -0.083 | -0.088 | -0.054 |

LINEAR MOTOR INCLUDING EXTENDED TOOTH TIPS

TECHNICAL FIELD

The present invention relates to a cogging reduction of a linear motor used for table feeding in an industrial machine such as a machine tool or semiconductor manufacturing equipment.

BACKGROUND ART

In a linear motor used for table feeding in an actuator of a machine tool or transporting equipment, if an armature coil of a rotor is shorter in length than an array of permanent magnets (an array of field magnets), because a magnetic circuit of the armature core is not endless, an end effect occurs. Thus, a one-cycle cogging thrust, that is a second-order cogging thrust, is generated in a pitch between the poles of the permanent magnet array. The second-order cogging thrust further generates a fourth- and a sixth-order cogging thrusts that are doubles of a harmonic wave thereof, resulting in an uneven thrust due to the rotor. Furthermore, because a first iron core has a slot in the same manner as in a conventional rotating motor, a slot cogging thrust is also produced. This also results in an uneven thrust.

A so-called magnetic attraction offsetting type linear motor that is a conventional linear motor includes: stators that are arranged side by side in parallel and onto which a plurality of equally spaced permanent magnets, having opposing polarities thereof arranged in an alternating manner along a direction of movement, are fastened on an inner surface thereof; and a rotor having divided cores each of which is wound with an armature coil, arranged in the direction of movement, and mechanically coupled to each other, and is divided and supported along the center of the stators in a movable manner along the direction of the movement, with the divided cores arranged so that the lateral sides thereof face the permanent magnets with an air gap therebetween to create a pole face. In such a linear motor, in response to the problem of the cogging thrust caused by the end effect, the permanent magnets on one of the stators that are provided side by side are arranged a half-pitch offset with respect to those on the other (see Patent Document 1 and Patent Document 2, for examples).

Another disclosed solution is to offset the positions of teeth, provided on each lateral side of the rotor, along the direction of the movement, instead of offsetting the positions of the permanent magnets on one of the stators, arranged side by side, with respect to those on the other along the direction of the movement (see the Patent Document 1, for example). Furthermore, as another disclosed solution to the issue of the slot cogging thrust, protrusions provided on the heads of the teeth are extended by different lengths in core blocks that are arranged adjacent to each other in an axial direction (for example, see Patent Document 3).

Patent Document 1: Japanese Patent Application Laid-open No. H11-262236 (Pages 3 to 4, FIGS. 1 and 7)
Patent Document 2: Japanese Patent Application Laid-open No. 2003-134790 (Pages 3 to 4, FIGS. 1 and 5)
Patent Document 3: Japanese Patent Application Laid-open No. 2007-60800 (Page 5, FIG. 4)

DISCLOSURE OF INVENTION

Problem to be Solved by the Invention

Such conventional linear motors have problems described below. If the positions of the permanent magnets on the stator are offset along the direction of the rotor movement, a longer space will be required for an installation of the linear motor. When the positions of the permanent magnets on the stator are not offset, an installation usually requires a space including a length of the rotor of the linear motor along the direction of the movement, and the length of the rotor movement. On the contrary, when the positions of the permanent magnets on the stator are offset along the direction of the rotor movement, an installation will require a space including a length of the rotor of the linear motor along the direction of the movement, the length of the rotor movement, and a length offset. Such a structure increases an equipment size, disadvantageously.

Furthermore, if the positions of the teeth on the rotor are offset along the direction of the rotor movement, the linear motor will require a longer installation space as well, assuming that such a structure requires the same length of the rotor movement as when the positions of the teeth are not offset. Such a structure also increases an equipment size disadvantageously. In addition, although such an arrangement, in which the positions of the permanent magnets on the stator or the teeth on the rotor are offset, can be applied to a magnetic attraction offsetting type linear motor, the arrangement cannot be applied to an opposing type linear motor that has a stator only on one lateral side.

Furthermore, even if the structure of a rotating motor having the protrusions on the heads of the teeth extended by different lengths is applied to a linear motor, the cogging thrust caused by the end effect cannot be reduced by applying a stepwise skew angle that is applied for reducing the slot cogging thrust.

The present invention is made in consideration of the above, and realizes a linear motor that can reduce a slot cogging thrust as well as a cogging thrust caused by the end effect of the rotor, without increasing the size of the equipment.

Means for Solving Problem

According to an aspect of the present invention there is provided a linear motor including: a stator having a plurality of field poles arranged linearly with opposing polarities thereof arranged in an alternating manner; and a rotor having an armature core with a plurality of teeth that faces a pole face of the field poles with a predetermined gap therebetween, and coils wound around the teeth, wherein the stator and the rotor are supported in a slidable manner, a direction perpendicular to a sliding direction of the rotor and in parallel with the pole face is defined as a stacking direction, a head of each of the teeth has an extended portion that is extended in the sliding direction, at least heads of the teeth arranged at both ends of the armature core along the sliding direction is divided into a plurality of areas along the stacking direction, and at least one of extended portions arranged on adjacent areas is extended by a different length along the sliding direction.

Effect of the Invention

In the linear motor according to the present invention, at least the head of each of the teeth located at both ends of the armature core in the sliding direction is divided into a plurality of areas along the stacking direction, and at least one of the extended portions arranged on the adjacent areas is extended by a different length along the sliding direction. Therefore, the slot cogging thrust and the cogging thrust caused by the end effect of the rotor can be reduced simultaneously, without increasing the equipment size.

BRIEF DESCRIPTION OF DRAWINGS

FIG. 3 indicates calculated theoretical effects of a stepwise skew, calculated for each angle thereof according to the first embodiment of the present invention.

FIG. 23 indicates calculated theoretical effects of a stepwise skew, calculated for each angle thereof according to the eighth embodiment of the present invention.

FIG. 26 indicates calculated theoretical effects of a stepwise skew, calculated for each angle thereof according to the ninth embodiment of the present invention.

FIG. 28 indicates calculated theoretical effects of a stepwise skew, calculated for each angle thereof according to the tenth embodiment of the present invention.

EXPLANATIONS OF LETTERS OR NUMERALS

1, 30, 40, 50, 60, 100 Linear motor
11, 111 Stator
12 Field core
13 Permanent magnets
21, 31, 41, 51, 61, 121 Rotor
22, 32, 42, 52, 62, 72, 82, 202, 212, 222, 232, 242, 252, 262, 272, 282 Armature core
23 Coils
24, 35, 36, 44, 45, 46, 55, 56, 65, 66, 74, 78, 204, 214, 224, 235, 236, 245, 246, 254, 264, 275, 276, 285, 286 Teeth
24a, 24b, 35a, 35b, 36a, 36b, 44a, 44b, 45a, 45b, 46a, 46b, 55a, 55b, 56a, 56b, 65a, 65b, 66a, 66b, 74a, 74c, 74e, 84a to 84b, 204a to 204c, 214a to 214d, 235a to 235c, 236a to 236c, 254a to 254f, 275a to 275f Core blocks

BEST MODES FOR CARRYING OUT THE INVENTION

First Embodiment

Figure 1:
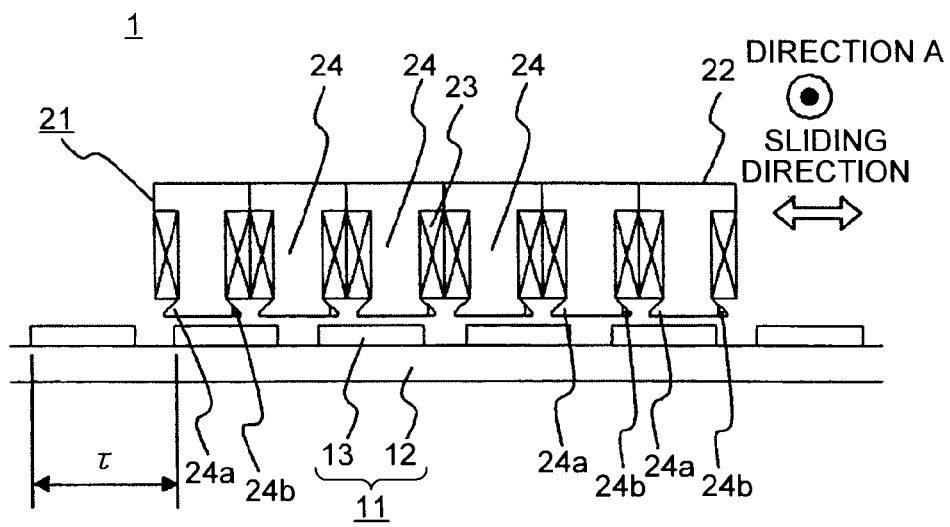
FIG. 1 is a sectional view of a linear motor according to a first embodiment of the present invention.

FIG. 1 is a sectional view of a linear motor according to a first embodiment of the present invention. In FIG. 1, a linear motor 1 includes a stator 11 and a rotor 21. This example according to the embodiment has a four-pole, six-toothed structure; however, the numbers of poles and teeth may be in any combination. The stator 11 and the rotor 21 are held with respect to each other with a predetermined gap therebetween, so that the stator 11 and the rotor 21 can be slid freely with respect to each other. A sliding direction is defined herein as a sliding direction in which the rotor 21 slides with respect to the stator 11. The stator 11 includes a field core 12 and a plurality of permanent magnets 13 to produce field poles. The permanent magnets 13 are arranged linearly on the field core 12 so that adjacent field poles oppose each other along the sliding direction. The permanent magnets 13 are arranged with a pole pitch τ. The rotor 21 includes an armature core 22 having a plurality of teeth 24 that faces a pole face of the permanent magnets 13 with a predetermined gap therebetween, and coils 23 wound around the teeth 24. The surfaces of the permanent magnets 13 facing the teeth 24 form the pole face, and the direction perpendicular to the sliding direction and in parallel with the pole face will be referred to as a direction A (stacking direction).

Figure 2:
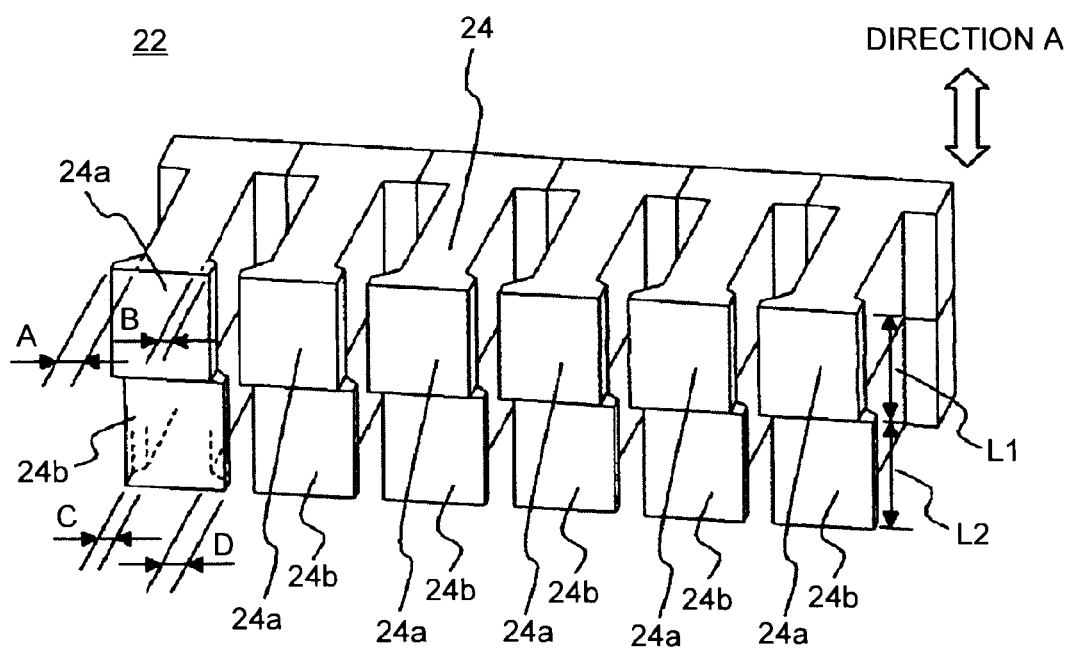
FIG. 2 is a perspective view of an armature core according to the first embodiment of the present invention.

FIG. 2 is a perspective view of the armature core 22 shown in FIG. 1. The armature core 22 includes the teeth 24. Extending portions that are extended in the sliding direction of the rotor 21 are formed at the head of each of the teeth 24. The head of each of the teeth 24 are divided into two core blocks that form a plurality of areas along the direction A that is perpendicular to the sliding direction of the rotor 21 and in parallel with the pole face of the permanent magnets 13. One of the core blocks is herein referred to as a first core block 24a, and the other is referred to as a second core block 24b. The extended portion on each of the first core block 24a and the second core block 24b that are adjacent areas are extended by different lengths along the sliding direction. In other words, the extended portions on the head of each of the teeth are formed differently in each of the core blocks 24a and 24b. Such a structure is herein referred to as a stepwise skew structure. According to the present embodiment, a length L1 of the first core block 24a along the direction A is determined with respect to a length L2 of the second core block 24b along the direction A so that the relationship between the L1 and L2 will be L1:L2=1:1; however, these lengths may be any other relationship.

In the first core block 24a, one side of the heads of the teeth is extended by a length A along the sliding direction, and the other side of the heads of the teeth is extended by a length B. In the second core block 24b, one side of the heads of the teeth is extended by a length C along the sliding direction, and the other side of the heads of the teeth is extended by a length D. The differences in the extended lengths converted into electric angles by way of formulas (1) and (2) are herein denoted as stepwise skew angles θ1 and θ2, respectively.

$$\theta 1 = (A-C) \times 180°/\tau \quad (1)$$

$$\theta 2 = (D-B) \times 180°/\tau \quad (2)$$

By setting the stepwise skew angles θ1 and θ2 to appropriate angles, the slot cogging thrust and the cogging thrust caused by the end effect of the rotor can be reduced simultaneously. According to the first embodiment, the same stepwise skew angle is provided to the head of each of the teeth included in the rotor 21.

FIG. 3 indicates calculated theoretical effects of a stepwise skew, calculated for each angle thereof. FIG. 3 indicates a ratio of a cogging component of each order, assuming that the cogging component is 1 when a stepwise skew angle is 0 degree, that is, with no stepwise skew (i.e., when A=C and B=D). In the table shown in FIG. 3, the numbers with a negative sign indicates that the phase of a cogging waveform is reversed. By giving stepwise skew angles, the cogging component of each order can be reduced by ratios shown in the table in FIG. 3, depending on the stepwise skew angle.

Figure 4:
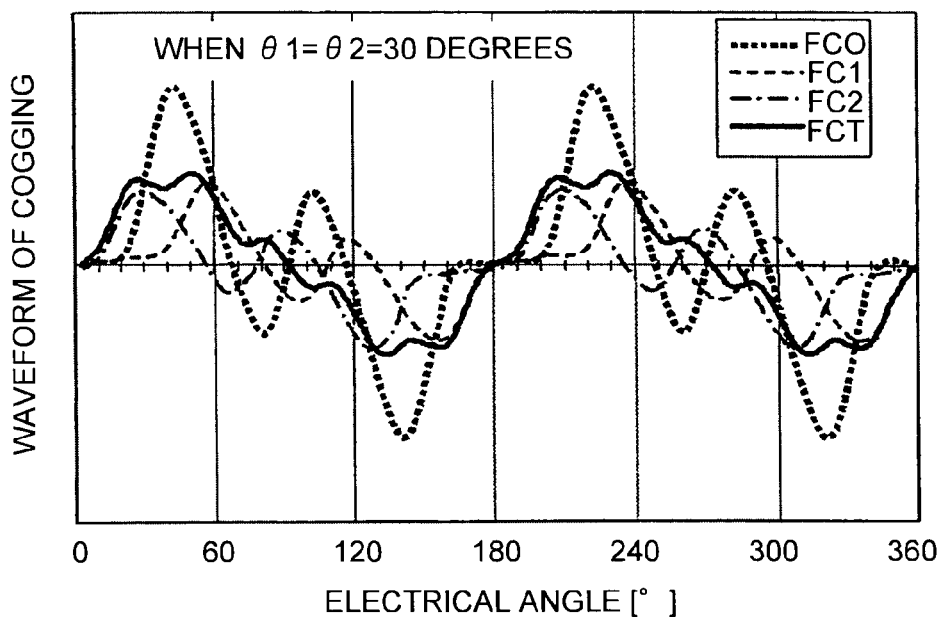
FIG. 4 is the waveform of a cogging thrust when the stepwise skew angles are set to 30 degrees according to the first embodiment of the present invention.

FIG. 4 is an exemplary waveform of a cogging thrust with stepwise skew angles of θ1=θ2=30 degrees. In FIG. 4, the horizontal axis indicates an electric angle, and the vertical axis indicates the size of a cogging waveform. Because only the relative size of each waveform is compared on the vertical axis, any scale can be used on the vertical axis. These cogging thrust waveforms are calculation results obtained from a magnetic field analysis. Because a combination of the numbers of the poles of the stator 11 and the teeth of the rotor 21 is four and six according to the embodiment, the sixth-order component is generated as a slot cogging thrust. In this situation, by setting the angle of the stepwise skew to 30 degrees as shown in the table in FIG. 3, the sixth-order component can be expected to reduce to almost zero.

FIG. 4 separately indicates a cogging thrust FC1 that is generated by a group of the first core blocks 24a, and a cogging thrust FC2 generated by a group of the second core blocks 24b. A cogging thrust FCT is obtained by synthesizing FC1 and FC2. FIG. 4 also indicates a cogging thrust FCO that is the result without applying any stepwise skew. By comparing the total cogging thrust FCT and the cogging thrust FCO, it can be seen that the cogging thrust is reduced by applying the stepwise skew.

Figure 5:
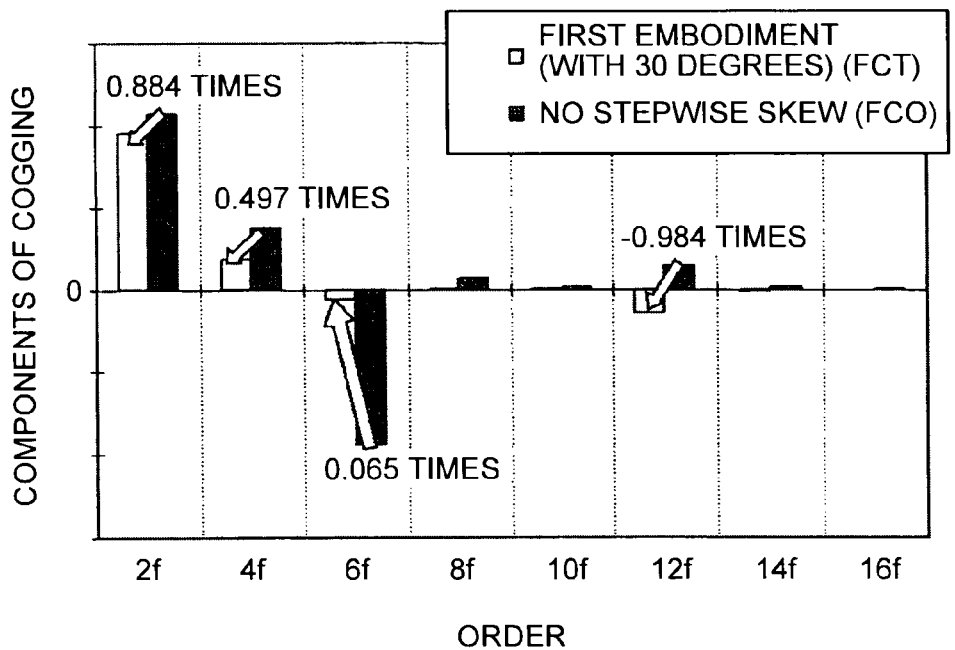
FIG. 5 indicates results of breaking down a cogging thrust into components of each order when the stepwise skew angles are set to 30 degrees according to the first embodiment of the present invention.

FIG. 5 indicates results of breaking down the total cogging thrust FCT in which the stepwise skew angles of θ1=θ2=30 degrees are applied as shown in FIG. 4, and the cogging thrust FCO without any application of the stepwise skews into each order component. In FIG. 5, the horizontal axis indicates each of the orders, and the vertical axis indicates the size of cogging components. In FIG. 5, when the stepwise skews are applied with the stepwise skew angles of θ1=θ2=30 degrees, the second-order component becomes 0.884 times, the fourth-order component becomes 0.497 times, the sixth-order component becomes 0.065 times (almost zero), and the twelfth component becomes −0.984 times of those without any application of a stepwise skew. Not only the sixth-order component generated as a slot cogging thrust is reduced to almost zero, but also the components of the other orders that are not the slot cogging thrust (those other than the sixth-order component), are reduced as a whole. Therefore, it can be seen that the slot cogging thrust and the cogging thrust caused by the end effect of the rotor are reduced simultaneously. Each order component of the total cogging thrust FCT becomes a multiple of that of the cogging thrust FCO at almost the same ratio as that shown in the table in FIG. 3 at a stepwise skew angle of 30 degrees.

Figure 6:
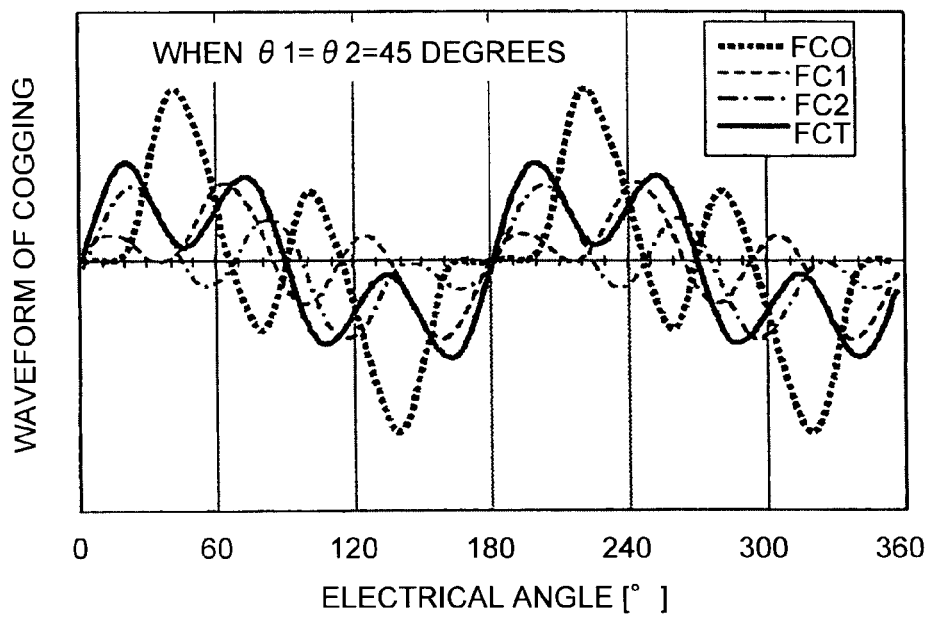
FIG. 6 is the waveform of a cogging thrust when the stepwise skew angles are set to 45 degrees according to the first embodiment of the present invention.

FIG. 6 is an exemplary waveform of the cogging thrust with the stepwise skew angles of θ1=θ2=45 degrees. FIG. 6 separately indicates the cogging thrust FC1 that is generated by the group of the first core blocks 24a, and a cogging thrust FC2 generated by the group of the second core blocks 24b. The cogging thrust FCT is obtained by synthesizing FC1 and FC2. In the same manner as in FIG. 4, FIG. 6 also indicates the cogging thrust FCO that is the result without any application of a stepwise skew. By comparing the total cogging thrust FCT and the cogging thrust FCO, it can be seen that the slot cogging thrust is reduced by applying the stepwise skew, as well as the clogging thrust caused by the end effect.

Figure 7:
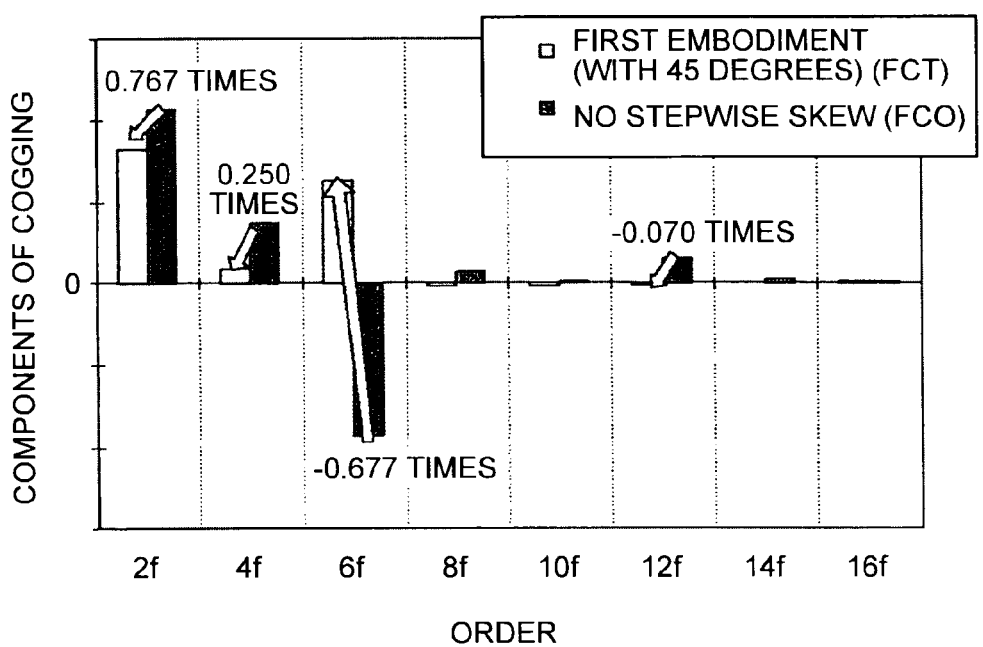
FIG. 7 indicates results of breaking down a cogging thrust into components of each order when the stepwise skew angles are set to 45 degrees according to the first embodiment of the present invention.

FIG. 7 indicates results of breaking down the total cogging thrust FCT in which the stepwise skew angles of θ1=θ2=30 degrees are applied as shown in FIG. 6, and the cogging thrust FCO without any application of a stepwise skew into each order component. In FIG. 7, when the stepwise skews are applied with the angles of θ1=θ2=45 degrees, the second-order component becomes 0.767 times, the fourth-order component becomes 0.250 times, the sixth-order component becomes −0.677 times, and the twelfth component becomes −0.070 times of those without applying any stepwise skew. Not only the sixth-order component generated as a slot cogging thrust is reduced, but also the components of the other orders that are not the slot cogging thrust (those other than the sixth-order component), are reduced as a whole. Therefore, it can be seen that the slot cogging thrust is reduced, as well as the cogging thrust caused by the end effect of the rotor. Each order-component of the total cogging thrust FCT becomes a multiple of that of the cogging thrust FCO at almost the same ratio as that shown in the table in FIG. 3 at stepwise skew angle of 45 degrees.

Upon deciding the stepwise skew angles, it is preferable to make the length A by which the one extended portion of the first core block 24a, which is one of the adjacent core blocks (areas), is extended in the sliding direction the same as the length D by which the other extended portion of the second core block 24b, which is the other adjacent core block (area), is extended in the sliding direction; and to make the length B by which the other extended portion of the first core block 24a is extended in the sliding direction the same as the length C by which the one extended portion of the second core block 24b is extended in the sliding direction. In other words, it is preferable to set the lengths A, B, C, and D so as to satisfy conditions A=D and B=C. Because the shapes of the first core block 24a and the second core block 24b will be the same when the first core block 24a is reversed, such a structure allows parts to be shared, and therefore, the number of parts to be reduced.

As described above, the armature core 22 is divided into the two core blocks 24a and 24b in the direction perpendicular to the sliding direction and in parallel to the pole face of the permanent magnets 13; the extended portions on the head of each of the teeth are formed to extend by different lengths; and the angles of the stepwise skew are set to a desirable value. In this manner, the slot cogging thrust, as well as the cogging thrust caused by the end effect of the rotor, can be reduced. Furthermore, the slot cogging thrust and the cogging thrust caused by the end effect of the rotor can be reduced even in an opposing type linear motor having the stator only on one lateral side.

Second Embodiment

Figure 8:
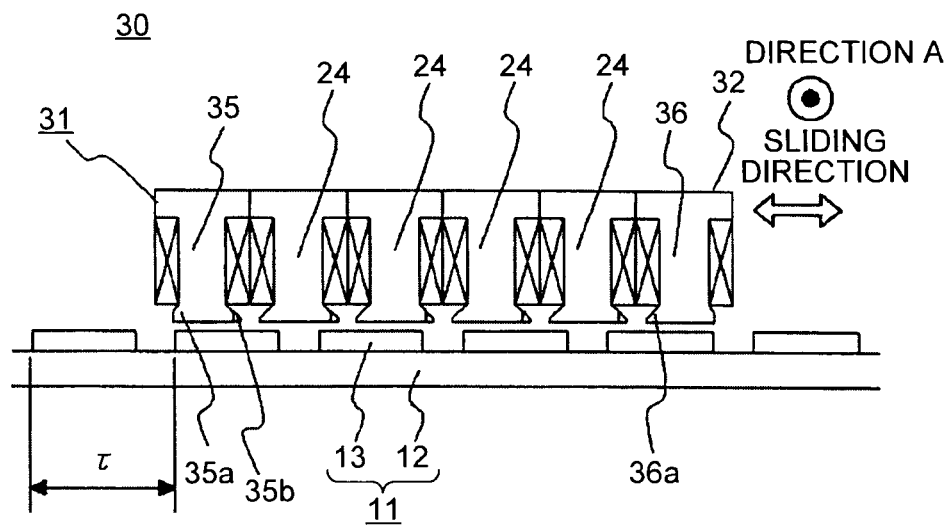
FIG. 8 is a sectional view of a linear motor according to a second embodiment of the present invention.

FIG. 8 is a sectional view of a linear motor according to a second embodiment of the present invention. A linear motor 30 according to the second embodiment is different from the one according to the first embodiment in that no stepwise skew is provided to the outer side of the heads of two teeth located at both ends of the armature core in the sliding direction. In FIG. 8, structures with the same reference numerals as in FIG. 1 are the same as or equivalent to those shown in FIG. 1, and the same can be said throughout the entire description. The implementations of the structures described herein are given only by way of examples, and the present invention is not limited by such descriptions in any way.

Figure 9:
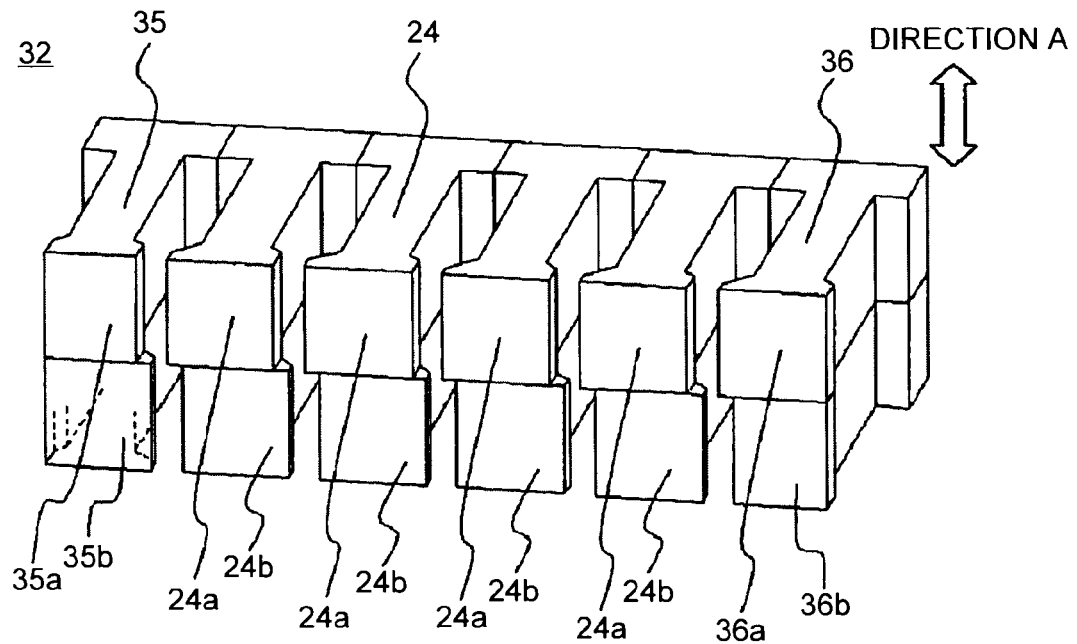
FIG. 9 is a perspective view of an armature core according to the second embodiment of the present invention.

FIG. 9 is a perspective view of an armature core 32 shown in FIG. 1. The armature core 32 includes teeth 24, 35, and 36. Extending portions that are extended in the sliding direction of a rotor 31 are formed at each of the head of the teeth 24, 35, and 36. The head of each of the teeth 24, 35, and 36 is divided into two core blocks that form a plurality of areas along the direction A that is perpendicular to the sliding direction of the rotor 31 and in parallel with the pole face of the permanent magnets 13. Ones of the core blocks are referred to as first core blocks 24a, 35a, and 36a, and the others are referred to as second core blocks 24b, 35b, and 36b. A stepwise skew is provided to the extended portions on the heads of the inner teeth 24 excluding the two teeth 35 and 36 located at both ends of the armature core 32 in the sliding direction, in the same manner as in the first embodiment.

A stepwise skew is provided to the inner-side extended portions on the heads of the teeth 35 and 36, located at both ends, (the side with an adjacent tooth) in the same manner as in the first embodiment. On the contrary, the outer-side extended portions of the teeth 35 and 36, arranged at both ends, (the side with no adjacent tooth) have a common shape in each of the core blocks that are areas adjacent to each other in the direction A. In other words, at least one of the extended portions on each of the first core block 35a (36a) or the second core block 35b (36b) that are areas adjacent to each other is extended by a different length along the sliding direction. Thus, no stepwise skew is provided to the outer side of the heads of the teeth 35 and 36 (the side with no adjacent tooth), located at both ends in the sliding direction.

Figure 10:
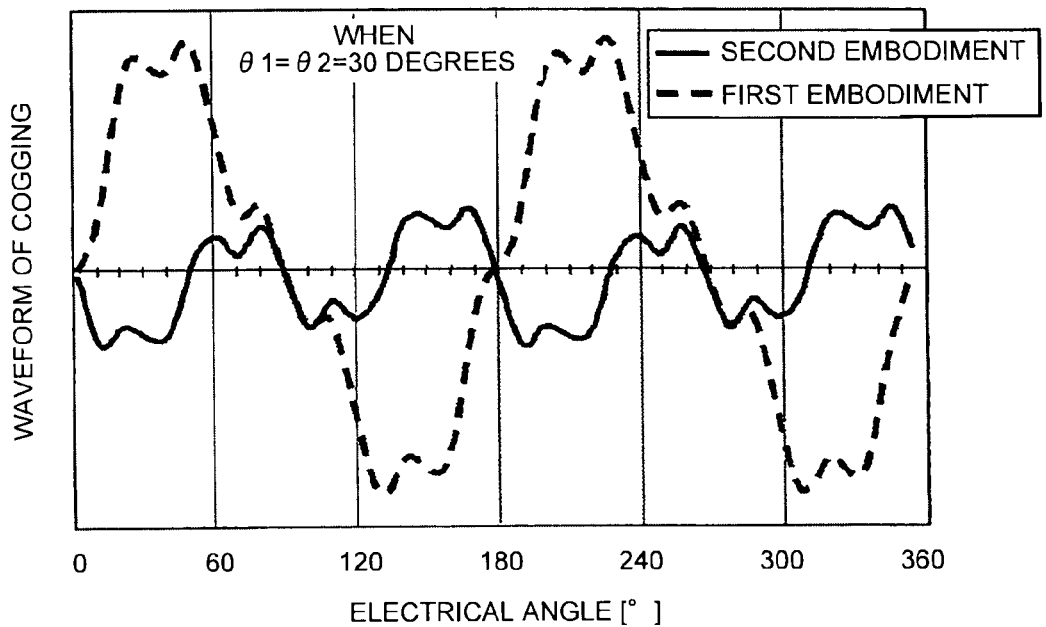
FIG. 10 is the waveform of a cogging thrust according to the second embodiment of the present invention.
Figure 11:
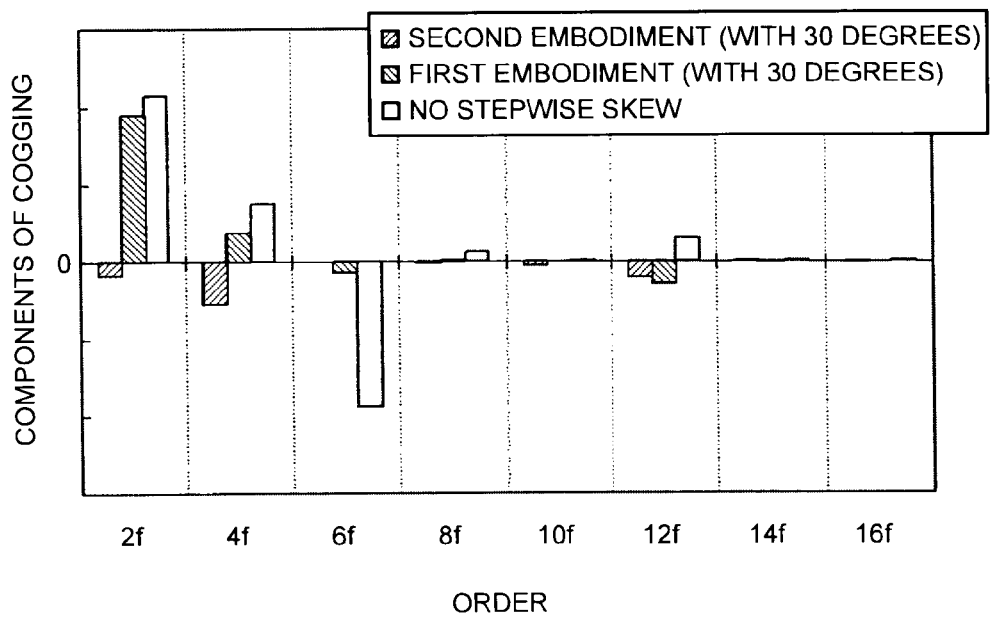
FIG. 11 indicates results of breaking down the cogging thrust according to the second embodiment of the present invention into components of each order.

FIG. 10 is an exemplary waveform of the cogging thrust when the stepwise skew angles of θ1=θ2=30 degrees are provided in the linear motor 30 having the structure described above. FIG. 11 indicates results of breaking down the total cogging thrust FCT in which the stepwise skew angles of θ1=θ2=30 degrees are applied as shown in FIG. 10, and the cogging thrust FCO without any application of the stepwise skews into each order component. As shown in FIGS. 10 and 11, when no stepwise skew is provided only to the outer side of the heads of the two teeth located at both ends in the sliding direction, the cogging thrust, especially the second-order component thereof, can be reduced in comparison with the structure in which the stepwise skew is provided to the heads of all of the teeth.

As shown in the table in FIG. 3, when an angle of equal to or less than 60 degrees is selected as stepwise skew angles, the second-order component of the cogging thrust is almost not reduced. However, by configuring the stepwise skews in the manner according to the present embodiment, the total cogging thrust can be reduced even if an angle of equal to or less than 60 degrees is selected as a stepwise skew angle. Preferably, it is desirable to select an angle between 25 to 50 degrees as a stepwise skew angle so that the forth- and the sixth-order component of the cogging thrust can also be reduced.

Third Embodiment

Figure 12:
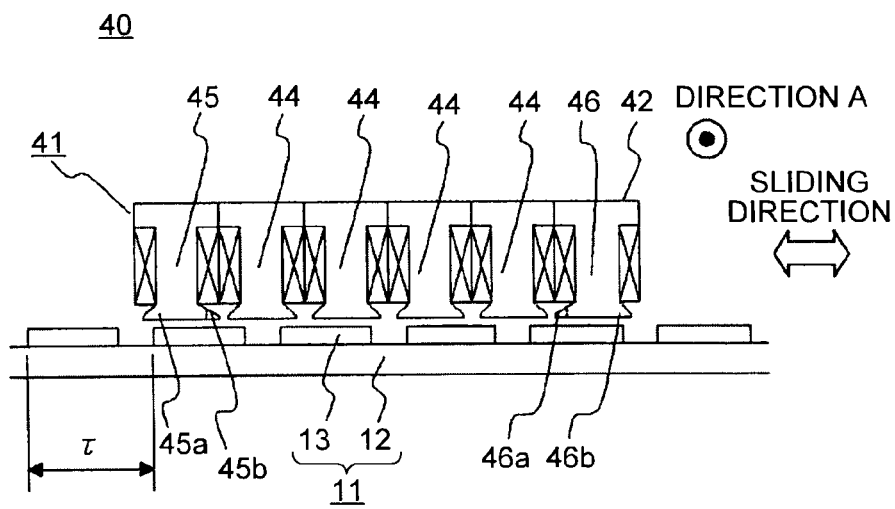
FIG. 12 is a sectional view of a linear motor according to a third embodiment of the present invention.

FIG. 12 is a sectional view of a linear motor according to a third embodiment of the present invention. A linear motor 40 according to the present embodiment is different from the one according to the first embodiment in that the stepwise skew is provided only to the inner side of the heads of two teeth located at both ends in the sliding direction. In FIG. 12, an armature core 42 includes teeth 44, 45, and 46. Extending portions that are extended in the sliding direction of a rotor 41 are formed at each of the head of the teeth 44, 45, and 46. The head of each of the teeth 45 and 46, located both ends in the sliding direction, is divided into two core blocks that form a plurality of areas along the direction A (stacking direction) that is perpendicular to the sliding direction of the rotor 41 and in parallel with the pole face of the permanent magnets 13. Ones of the core blocks are referred to as first core blocks 45a and 46a, and the others are referred to as second core blocks 45b and 46b.

The inner extended portion on the first core block 45a, the inner being in the sliding direction (the side with an adjacent tooth), is extended by a different length from that on the second core block 45b that is the area adjacent to the first core block 45a. In the same manner, the inner extended portion on the first core block 46a the inner being in the sliding direction (the side with an adjacent tooth), is extended by a different length from that on the second core block 46b that is the area adjacent to the first core block 46a. In other words, a stepwise skew is provided to the inner side of the head of each of the two teeth 45 and 46 positioned at both ends in the sliding direction. On the contrary, the outer side of the head of each of the teeth 35 and 36 located at both ends (the side with no adjacent tooth) has the same shape as those in each of the core blocks that are areas adjacent to each other in the direction A. In other words, no stepwise skew is provided to the outer side of the heads of the two teeth 45 and 46 located at both ends in the sliding direction. In this structure, no stepwise skew is provided to the heads of the teeth 44, excluding the teeth 45 and 46 arranged at both ends in the sliding direction, and the extended portions on the core blocks adjacent to each other along the direction A have the same shape.

Figure 13:
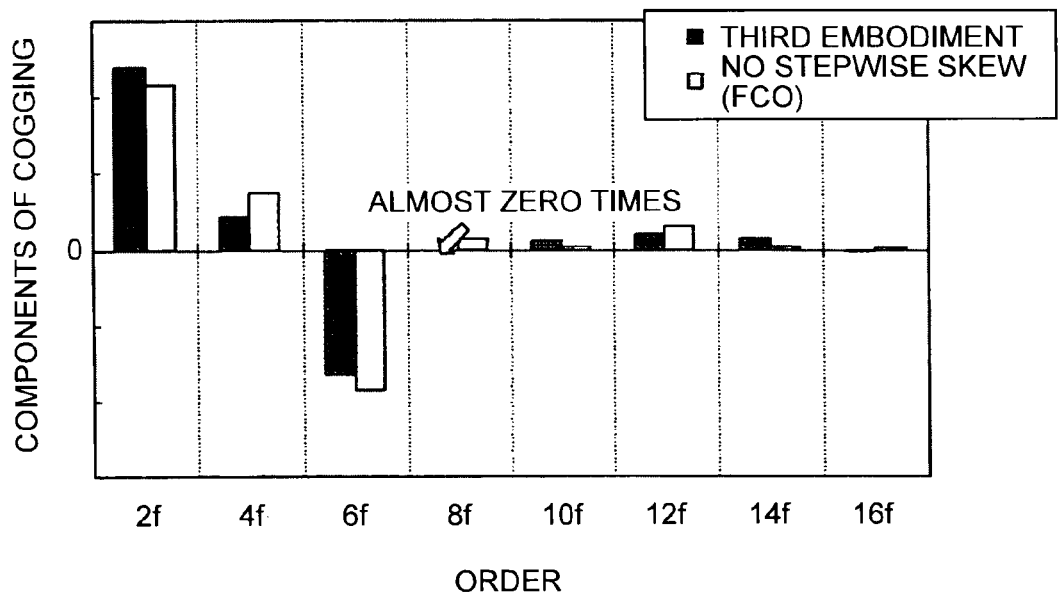
FIG. 13 indicates results of breaking down a cogging thrust according to third embodiment of the present invention into components of each order.

FIG. 13 indicates results of breaking down the total cogging thrust FCT in which the stepwise skew angles of θ1=θ2=30 degrees are applied to the linear motor 40 having the structure described above, and the cogging thrust FCO without any application of the stepwise skews into each order component. As shown in FIG. 13, when the stepwise skew is provided only to the inner side of the heads of the two teeth located at both ends in the sliding direction, the eighth-order component of the cogging thrust can be reduced to almost zero in comparison with the structure where no stepwise skew is provided.

Fourth Embodiment

Figure 14:
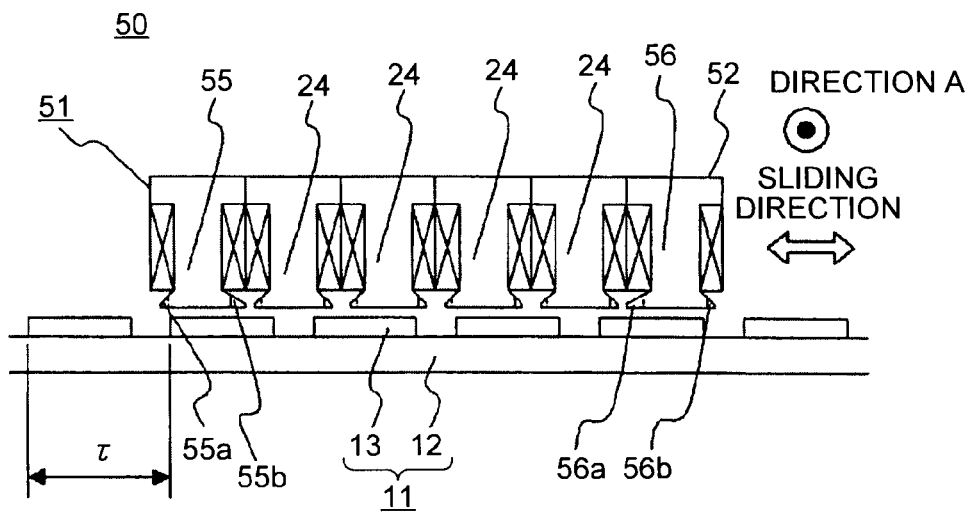
FIG. 14 is a sectional view of a linear motor according to a fourth embodiment of the present invention.

FIG. 14 is a sectional view of a linear motor according to a fourth embodiment of the present invention. A linear motor 50 according to the present embodiment is different from the one according to the first embodiment in that a stepwise skew of a different angle is provided only to the inner side of the heads of the two teeth located at both ends in the sliding direction. An armature core 52 includes teeth 24, 55, and 56. Extending portions that are extended in the sliding direction of a rotor 51 are formed on the head of each of the teeth 24, 55, and 56. The head of each of the teeth 24, 55, and 56 is divided into two core blocks that form a plurality of areas along the direction A (stacking direction) that is perpendicular to the sliding direction of the rotor 51 and in parallel with the pole face of the permanent magnets 13. Ones of the core blocks are referred to as first core blocks 24a, 55a, and 56a, and the others are referred to as second core blocks 24b, 55b, and 56b. A stepwise skew is provided to the extended portions located at both sides of the inner teeth 24, excluding the two teeth 55 and 56 located at both ends in the sliding direction, in the same manner as in the first embodiment. A stepwise skew is also provided only to the extended portions located on the outer side (the side with no adjacent tooth) of the two teeth 55 and 56 located at both ends in the sliding direction of the armature core 52, in the same manner as in the first embodiment, although they are provided only to one side.

On the contrary, on at least one of the core blocks 55a or 55b (56a or 56b), the inner extended portions arranged on the heads of the teeth 55 and 56 (the extended portion on the side with an adjacent tooth), located at both ends, is extended by a different length in the sliding direction, with respect to the extended portions of the teeth 24 located at positions other than both ends, and to the outer extended portions on the head of the teeth 55 and 56. In other words, the inner extended portions on the teeth 55 and 56, located at both ends, have a different shape in each of the core blocks that are adjacent in the A direction, and are extended by different lengths in comparison with the extended portions on the heads of the other teeth. In other words, a stepwise skew of a different angle is provided only to the inner side of the head of the two teeth 55 and 56 (the side with an adjacent teeth) that are located at both ends in the sliding direction.

Figure 15:
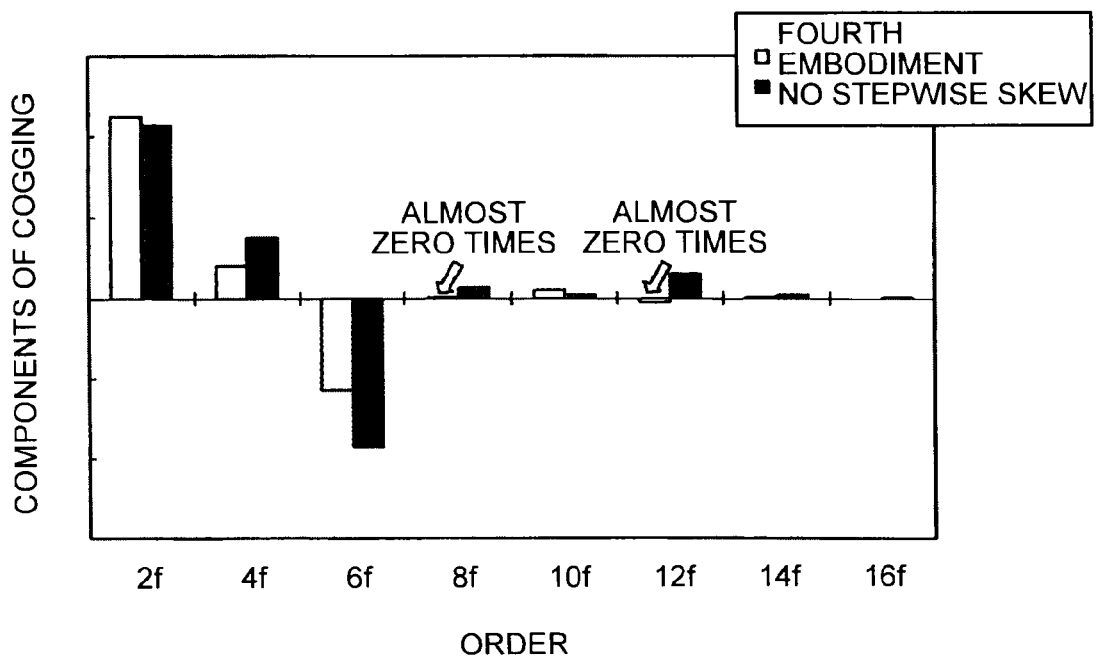
FIG. 15 indicates results of breaking down a cogging thrust according to the fourth embodiment of the present invention into components of each order.

The linear motor 50 having such a structure can achieve the effect of the first embodiment, as well as that of the third embodiment. FIG. 15 indicates results of breaking down the total cogging thrust FCT and the cogging thrust FCO into each order component. For the total cogging thrust FCT, a stepwise skew angle of 15 degrees is applied to each of the outer side of the heads of the two teeth 55 and 56 located at both ends, and to the heads of the inner teeth 24, and a stepwise skew angle of 30 degrees is applied to the inner side of the heads of the two teeth 55 and 56 located at both ends; and for the cogging thrust FCO, no stepwise skew is applied. As shown in FIG. 15, in the structure where a stepwise skew of a different angle is provided only to the inner side of the heads of the teeth located at both ends in the sliding direction, the eighth-order and the twelfth-order components of the cogging thrust can be reduced to almost zero, in comparison with the structure without application of any stepwise skew. According to the present embodiment, the structure with a stepwise skew angle of 15 degrees in the first embodiment is combined with the structure in the third embodiment. In this manner, the eighth-order and the twelfth-order components of the cogging thrust are cancelled out, achieving the effect of the first embodiment as well as that of the third embodiment.

Fifth Embodiment

Figure 16:
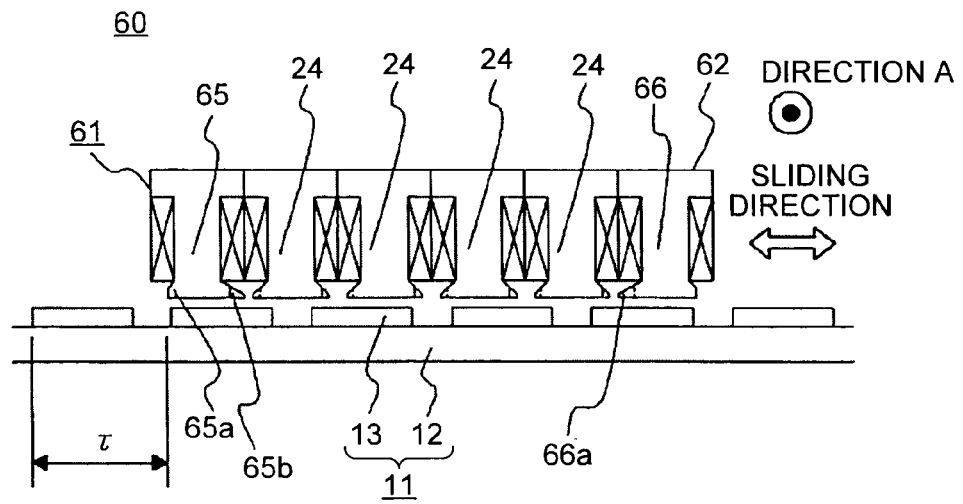
FIG. 16 is a sectional view of a linear motor according to a fifth embodiment of the present invention.

FIG. 16 is a sectional view of a linear motor according to a fifth embodiment of the present invention. A linear motor 60 according to the present embodiment is different from the one according to the second embodiment in that a stepwise skew of a different angle is provided only to the inner side of the heads of the two teeth located at both ends in the sliding direction. In FIG. 16, an armature core 62 includes teeth 24, 65, and 66. Extending portions that are extended in the sliding direction of a rotor 61 are formed on the head of each of the teeth 24, 65, and 66. The head of each of the teeth 24, 65, and 66 is divided into two core blocks that form a plurality of areas along the direction A (stacking direction) that is perpendicular to the sliding direction of the rotor 61 and in parallel with the pole face of the permanent magnets 13. Ones of the core blocks are referred to as first core blocks 24a, 65a, and 66a, and the others are referred to as second core blocks 24b, 65b, and 66b (not shown). Stepwise skews are provided to the extended portions at both sides of each of the inner teeth 24, excluding the two teeth 65 and 66 located at both ends of the armature core 62 in the sliding direction, in the same manner as in the first embodiment. However, no stepwise skew is provided to the outer-side extended portions (the side with no adjacent tooth) of the two teeth 65 and 66 located at both ends of the armature core 62 in the sliding direction, in the same manner as in the second embodiment.

On the contrary, on at least one of the core blocks 65a or 65b (66a or 66b), the inner extended portions (the extended portions on the side with an adjacent tooth) arranged on the heads of the teeth 65 and 66 located at both ends are extended by different lengths, with respect to the extended portions on the teeth 24 provided at positions other than both ends. In other words, the inner extended portions on the teeth 65 and 66, located at both ends, have a different shape in each of the core blocks that are adjacent in the direction A, and is extended by a different length in comparison with the extended portions on the heads of the other teeth. In other words, a stepwise skew of a different angle is provided only to the inner side of the heads of the two teeth 65 and 66 that are located at both ends of the armature core 62 in the sliding direction, in comparison with the angle provided to the heads of the inner teeth 24.

Figure 17:
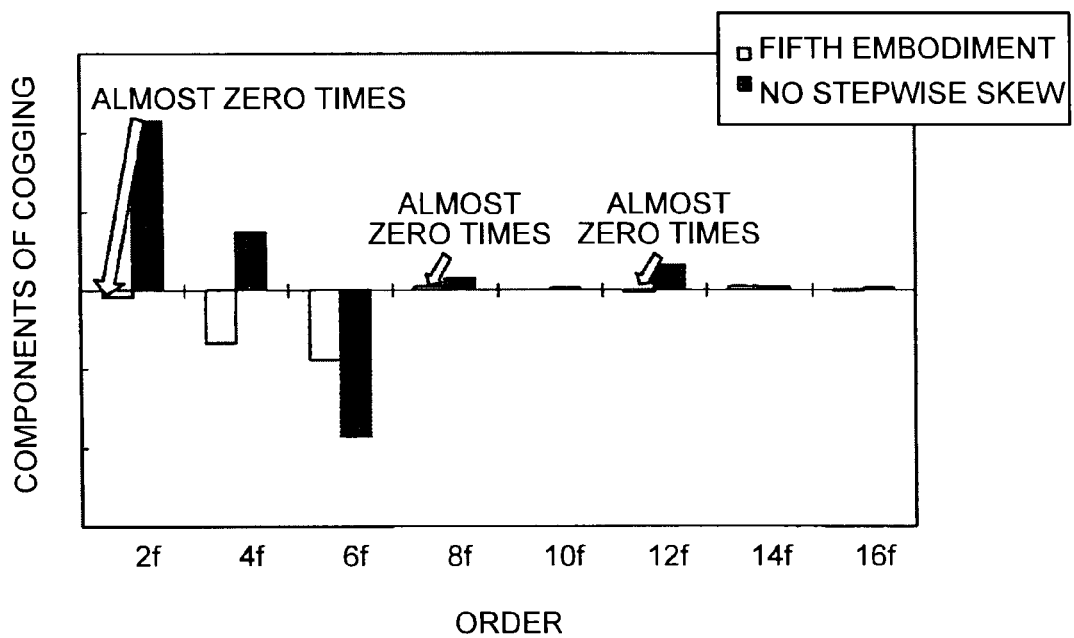
FIG. 17 indicates results of breaking down a cogging thrust according to the fifth embodiment of the present invention into components of each order.

FIG. 17 indicates results of breaking down the total cogging thrust FCT and the cogging thrust FCO into each order component. For the total cogging thrust FCT, a stepwise skew angle of 15 degrees is applied to the heads of the inner teeth 24, and a stepwise skew angle of 30 degrees is applied to the inner side of the heads of the two teeth 65 and 66 located at both ends; and for the cogging thrust FCO, no stepwise skew is applied. As shown in FIG. 17, in the structure where the stepwise skew of a different angle is provided only to the inner side of the heads of the teeth located at both ends of the armature core 62 in the sliding direction from those of the other stepwise skews, and where no stepwise skew is provided to outer side of these two teeth, the eighth-order and the twelfth-order components, as well as the second-order component, of the cogging thrust can be reduced to almost zero, in comparison with the structure without giving any stepwise skew.

Sixth Embodiment

Figure 18:
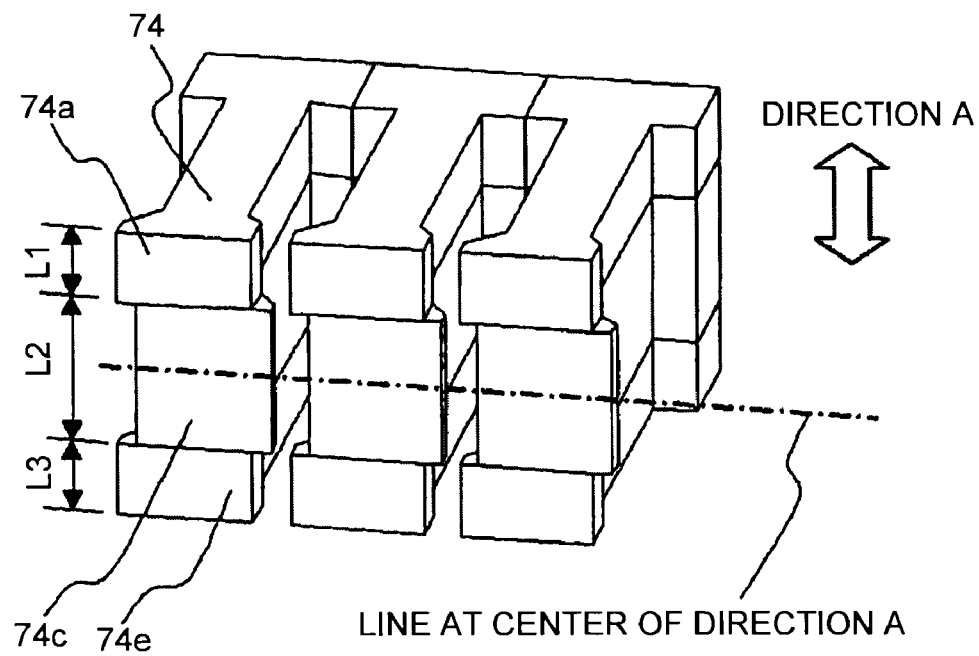
FIG. 18 is a perspective view of an armature core according to a sixth embodiment of the present invention.

FIG. 18 is a perspective view of an armature core according to a sixth embodiment of the present invention. The present embodiment is different from the first embodiment in that the head of each of the teeth is divided into three core blocks. In FIG. 18, an armature core 72 includes teeth 74. Extending portions that are extended in the sliding direction of the rotor are formed on the head of each of the teeth 74. The head of each of the teeth 74 is divided into three core blocks, that is, a first core block 74a, a second core block 74c, and a third core block 74e, along the direction A (stacking direction) that is perpendicular to the sliding direction of the rotor and in parallel with the pole face.

When viewed from a direction in perpendicular to the pole face, the sliding-direction width of each of the core blocks 74a, 74c, and 74e is adjusted so as to form a linear symmetry along a center line running in the sliding direction and passing through a center of two ends of the head of each of the teeth 74 in the direction A (a line at the center of the direction A). According to the present embodiment, a length L1 of the first core block 74a in the direction A, a length L2 of the second core block 74c in the direction A, and a length L3 of the core block 74e in the direction A are set to be in a relationship of L1:L2:L3=1:2:1; however, any other relationship may also be used.

Figure 19:
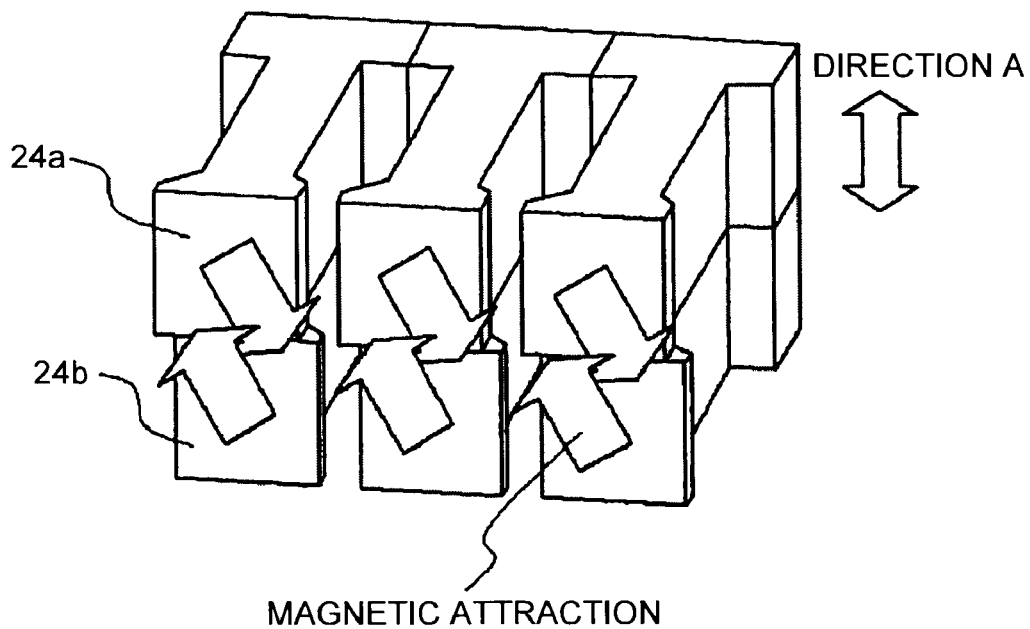
FIG. 19 is an illustrative diagram of magnetic attractions working in the armature core according to the sixth embodiment of the present invention.

An effect achieved by dividing the head of each of the teeth 74 into three core blocks will now be explained. As shown in FIG. 19, when the armature core is divided into two core blocks in the direction A in the manner disclosed in the first to the fifth embodiments, a magnetic attraction works in the direction A, from the first core block 24a and the second core block 24b toward the permanent magnets. At this time, the first core block 24a and the second core block 24b are provided relatively offset with respective to each other along the sliding direction. Therefore, when viewed from the center of the boundary between the first core block 24a and the second core block 24b, a rotating force is generated by the magnetic attraction working between the first core block 24a and the permanent magnets 13, and the second core block 24b and the permanent magnets 13. This rotating force can become a cause of a vibration and a noise when the rotating force is communicated to a linear guide that supports the rotor 21, and might result in a shorter lifetime of the linear guide.

However, when three core blocks are arranged offset to each other in an alternating manner along the sliding direction as disclosed herein in the embodiment, a magnetic attraction generated between each of the three core blocks and each of the permanent magnets cancels out each other, when viewed from the center of the entire three core blocks. Therefore, no rotating force is communicated to the linear guide, thus not causing the problem mentioned above.

Seventh Embodiment

Figure 20:
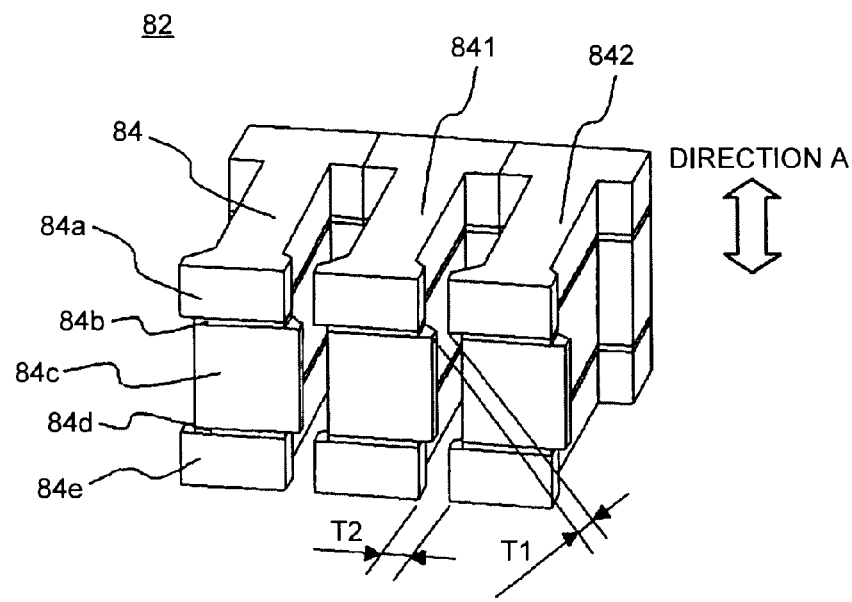
FIG. 20 is a perspective view of an armature core according to a seventh embodiment of the present invention.

FIG. 20 is a perspective view of an armature core according to a seventh embodiment of the present invention. The seventh embodiment is different from the sixth embodiment in that the head of each of the teeth is divided into five core blocks. In FIG. 20, an armature core 82 includes teeth 84. Extending portions that are extended in the sliding direction of the rotor are formed on the head of each of the teeth 84. The head of each of the teeth 84 is divided into five core blocks 84a to 84e along the direction A (stacking direction) that is perpendicular to the sliding direction of the rotor and in parallel with the pole face. When viewed from the direction in perpendicular to the pole face, the sliding-direction width of each of the core blocks 84a to 84e is adjusted so as to form a linear symmetry along a center line running in the sliding direction and passing through a center of two ends of the head of each of the teeth 84 in the direction A (a line at the center of the direction A).

An explanation will now be given on how to determine the length by which the core block 84b, that is an additional area, is extended. A length by which one of the extended portions on the core block 84b is extended in the sliding direction is set to almost the same length as the shorter one of the extended portions on the adjacent core blocks 84a and 84c extended in the sliding direction (for example, the length by which the core block 84c, is extended). A length by which the other extended portion of the core block 84b is extended in the sliding direction is set to almost the same length as the shorter one of the length by which the other extended portion of the adjacent core blocks 84a and 84c are extended in the sliding direction (for example, the length by which the core block 84a is extended). A length by which the core block 84d that is an additional area is extended is set in the same manner. In other words, the core blocks that have extended portions having the length of a shorter one of the extended portions on the heads of the teeth of the first core block 84a, the third core block 84c, the fifth core block 84e are inserted as the second core block 84b and the fourth core block 84d.

In the structure having the head of each of the teeth divided into three, as disclosed in the sixth embodiment, the extended portion on the core block 74c included in the head of the tooth 74 is located near the extended portion on the core block 74a included in the head of the adjacent tooth, as shown in FIG. 18. In the same manner, the extended portion on the core block 74c included in the head of the tooth 74 is located near the extended portion on the core block 74e included in the head of the adjacent tooth. In such an arrangement, a magnetic flux leaks at such areas where the extended portions of the adjacent teeth are located nearby, to deteriorate the efficiency of the linear motor.

On the contrary, according to the present embodiment, because the second core block 84b and the fourth core block 84d are inserted, the extended portion on the core block 84c included in the head of a tooth 841 can be arranged at a longer distance to the extended portion on the core block 84a included in the head of an adjacent tooth 842. In this manner, the leakage of the magnetic flux can be reduced, improving the efficiency of the linear motor.

Preferably, each of the core blocks 84a to 84e should be arranged in the manner described below. As shown in FIG. 20, the tooth adjacent to the first tooth 841 in the sliding direction is referred to as the second tooth 842; out of the extended portions on the two core blocks 84c and 84e that are adjacent to each other, having the core block 84d that is an additional area interposed therebetween, and is included in the head of the first tooth 841, the extended portion on the core block 84c extending toward to the second tooth 842 is referred to as a first extended portion; out of the extended portions of the two core blocks 84c and 84e that are adjacent to each other, having the core block 84d provided in the second tooth 842 corresponding to the core block 84d in the first tooth 841 interposed therebetween, the extended portion on the core block 84e, extending toward the first tooth 841 is referred to as a second extended portion; the shortest distance between the first extended portion and the second extended portion facing each other is denoted as T1; and the width of the slot opening between the first and the second teeth in the sliding direction is denoted as T2. Under these settings, each of the core blocks

84*a* to 84*e* is arranged so as to satisfy a relationship T1≧T2. By configuring the armature core in the manner described above, the magnetic flux can be prevented from leaking between the adjacent teeth, and a highly efficient linear motor can be provided.

Eighth Embodiment

Figure 21:
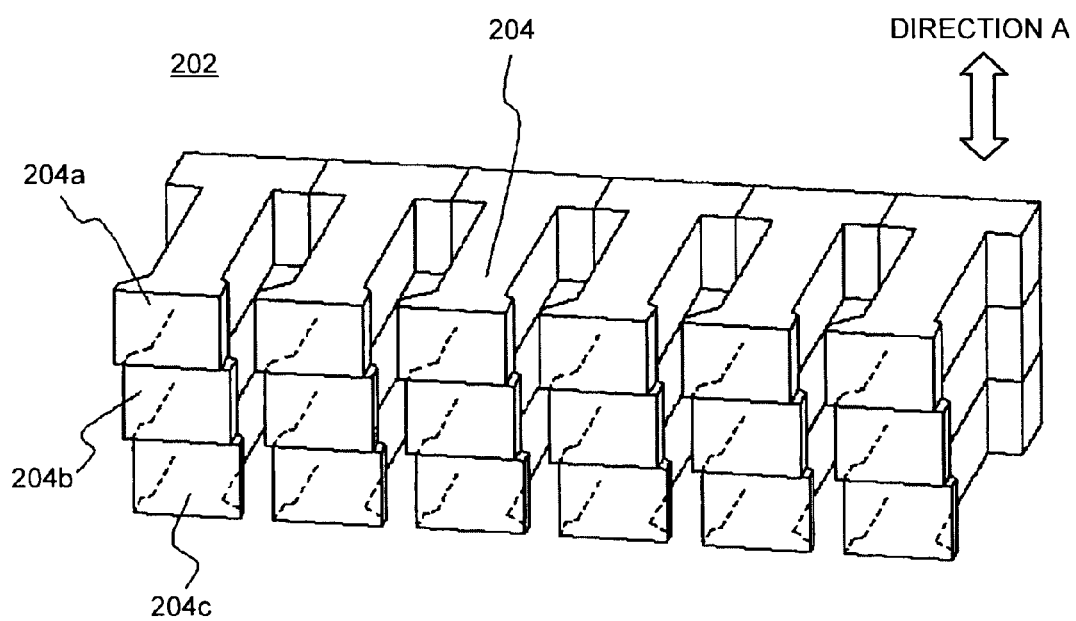
FIG. 21 is a perspective view of an armature core according to an eighth embodiment of the present invention.
Figure 22:
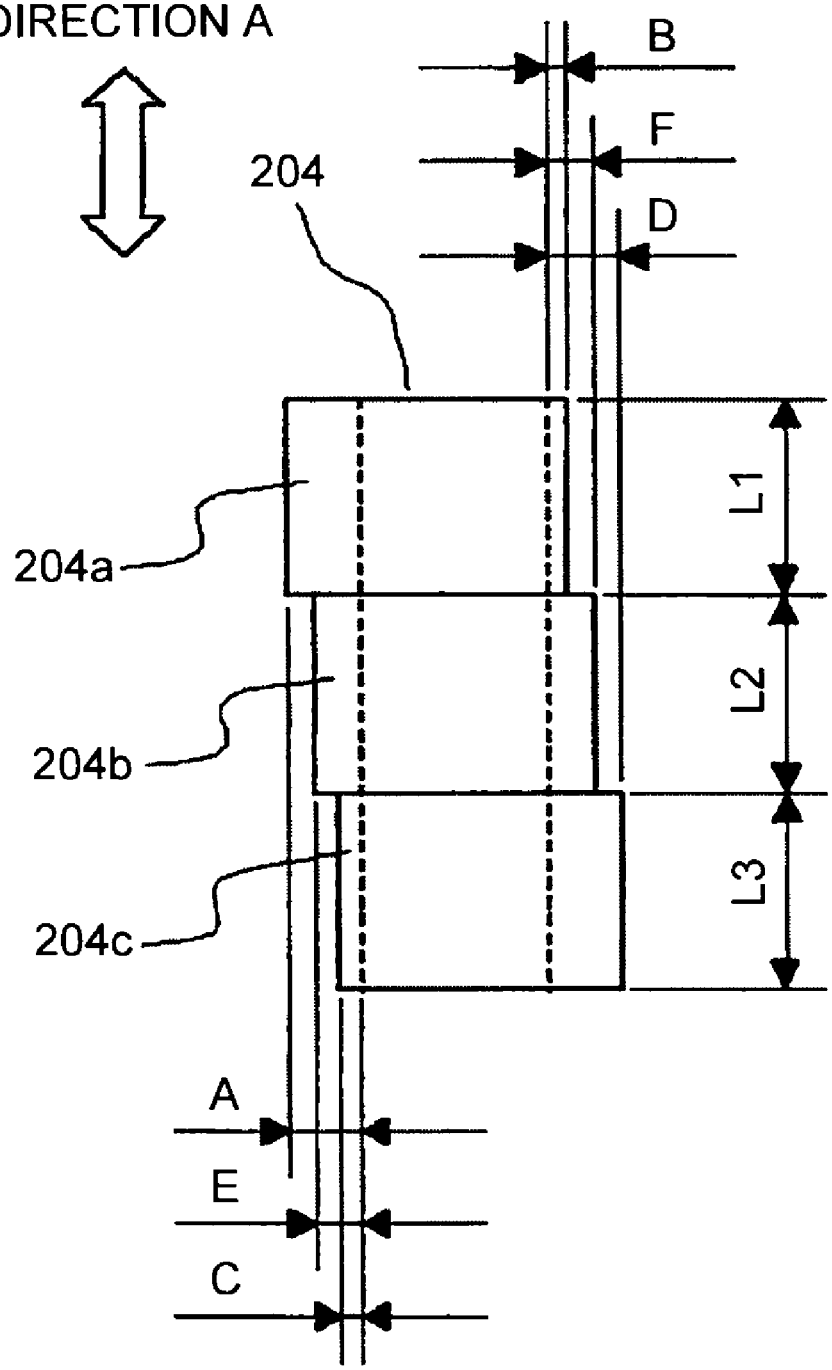
FIG. 22 is an external view of the heads of teeth according to the eighth embodiment of the present invention.

FIG. 21 is a perspective view of an armature core according to an eighth embodiment of the present invention. The present embodiment is different from the first embodiment in that the head of each of the teeth is divided into three core blocks, and is different from the sixth embodiment in that the extended portions of each of the blocks is longer or shorter in length all monotonically along the direction A (stacking direction) that is perpendicular to the sliding direction of the rotor and in parallel with the pole face. FIG. 22 is an external view of the heads of the teeth viewed from a direction perpendicular to the pole face. In FIG. 21, an armature core 202 includes teeth 204. Extended portions that are extended in the sliding direction of the rotor are formed at the head of each of the teeth 204. The head of each of the teeth 204 has a three-stepwise skew structure that is divided into three core blocks that form a plurality of areas along the direction A. These core blocks are referred to as a first core block 204*a*, a second core block 204*b*, and a third core block 204*c*. The first core block 204*a*, is the area at one end in the stacking direction, and the third core block 204*c* is the area at the other end in the stacking direction.

Both of the extended portions are extended by different lengths in the sliding direction in the adjacent areas, that is, between the first core block 204*a* and the second core block 204*b*, and between the second core block 204*b*, and the third core block 204*c*. In other words, the core blocks 204*a*, 204*b*, and 204*c* have the extended portions of different shapes on the respective heads of the teeth 204. According to the present embodiment, a length L1 of the first core block 204*a* in the direction A, a length L2 of the second core block 204*b* in the direction A, and a length L3 of the third core block 204*c* in the direction A are set to be in a relationship of L1:L2:L3=1:1:1; however, any other relationship may also be used.

As shown in FIG. 22, one side of the head of the tooth 204 is extended by a length A, and the other side is extended by a length B in the first core block 204*a*; one side of the head of the tooth 204 is extended by a length E, and the other side is extended by a length F in the second core block 204*b*; and one side of the head of the tooth 204 is extended by a length C, and the other side is extended by a length D in the third core block 204*c*. In FIG. 22, the relationship of the lengths by which the one sides extend is set to A>E>C, and that of the lengths by which the other sides extend is set to B<F<D; however, alternatively, the relationship of the lengths by which the one sides extend may be set to A<E<C, and that of the lengths by which the other sides extend may be set to B>F>D. These differences in the extended lengths converted into electric angles by way of the formulas (1) and (2) mentioned in the first embodiment are denoted as stepwise skew angles θ1 and θ2, respectively.

By setting the stepwise skew angles θ1 and θ2 to appropriate angles, the slot cogging thrust and the cogging thrust caused by the end effect of the rotor can be reduced simultaneously. According to the present embodiment, the same stepwise skew angle is provided to the head of each of the teeth 204 included in the armature core 202. According to the present embodiment, the second core block 204*b* is set to extend by the lengths E=(A+C)/2 and F=(B+D)/2, so that each of the lengths by which each of the core blocks 204*a* to 204*c* extends will be equal.

FIG. 23 indicates calculated theoretical effects of stepwise skew, calculated for each angle thereof. FIG. 23 indicates a ratio of a cogging component of each order, assuming that the cogging component is 1 when a stepwise skew angle is 0 degree, that is, with no stepwise skew (i.e., when A=E=C and B=F=D). In the table shown in FIG. 23, the numbers with a negative sign indicates that the phase of a cogging waveform is reversed. By giving a stepwise skew angle, the cogging component of each order can be reduced by the ratios shown in the table in FIG. 23, depending on the stepwise skew angle. As one may realize from the table shown in FIG. 23, by giving the three-stepwise skew structure to the heads of the teeth 204, the sixth- to sixteenth-order components of the cogging are reduced greatly, especially at the stepwise skew angle of approximately 30 degrees, in comparison with the structure according to the first embodiment.

Upon deciding the stepwise skew angles, it is preferable to make the length A by which the one extended portion of the first core block 204*a* is extended in the sliding direction the same as the length D by which the other extended portion of the third core block 204*c* is extended in the sliding direction; and to make the length B by which the other extended portion of the first core block 204*a* is extended in the sliding direction the same as the length C by which the one extended portion of the third core block 204*c* is extended in the sliding direction. In other words, it is preferable to set the lengths A, B, C, and D so as to satisfy conditions A=D and B=C. Because the shapes of the first core block 204*a* and the third core block 204*c* will be the same when the first core block 204*a* is reversed, such a structure allows parts to be shared, and therefore, the number of parts to be reduced.

As described above, the head of each of the teeth 204 is divided into the three core blocks 204*a*, 204*b*, and 204*c*; the extended portions on the head of each of the teeth 204 are formed to extend by different lengths; and the angles of stepwise skew are set to a desirable value. In this manner, the slot cogging thrust and the cogging thrust caused by the end effect of the rotor can be reduced simultaneously. Furthermore, the slot cogging thrust and the cogging thrust caused by the end effect of the rotor can be reduced, even in an opposing type linear motor having the stator only on one lateral side.

Ninth Embodiment

Figure 24:
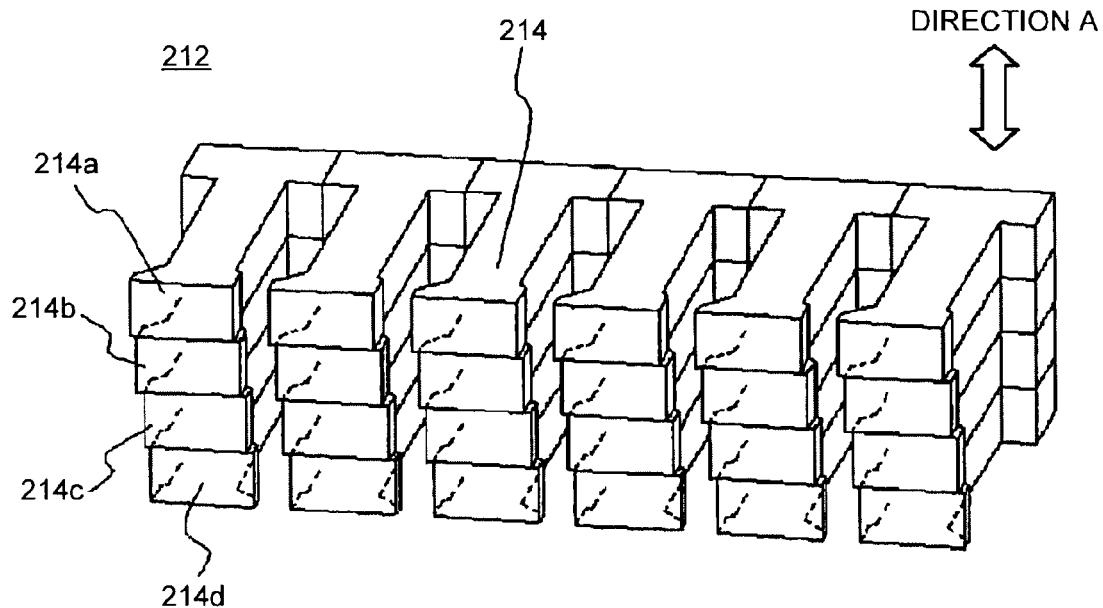
FIG. 24 is a perspective view of an armature core according to a ninth embodiment of the present invention.
Figure 25:
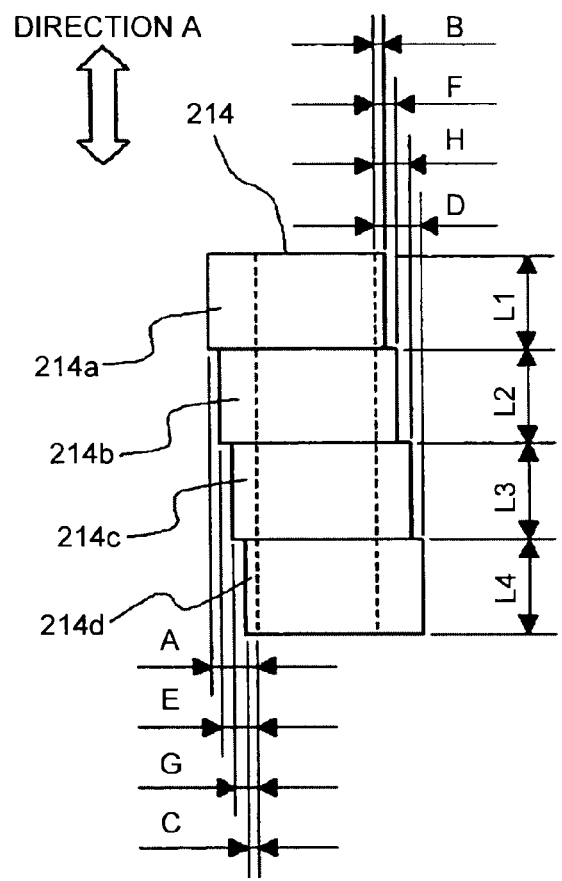
FIG. 25 is an external view of the heads of teeth according to the ninth embodiment of the present invention.

FIG. 24 is a perspective view of an armature core according to a ninth embodiment of the present invention. The ninth embodiment is different from the eighth embodiment in that the head of each of the teeth is divided into four core blocks. FIG. 25 is an external view of the heads of the teeth viewed from a direction perpendicular to the pole face. In FIG. 24, an armature core 212 includes teeth 214. Extended portions that are extended in the sliding direction of the rotor are formed on the head of each of the teeth 214. The head of each of the teeth 214 has a four-stepwise skew structure that is divided into four core blocks that form a plurality of areas along the direction A (stacking direction) that is perpendicular to the sliding direction of the rotor and in parallel with the pole face. These core blocks are referred to as a first core block 214*a*, a second core block 214*b*, a third core block 214*c*, and a fourth core block 214*d*. The first core block 214*a* is the area at one end in the stacking direction, and the fourth core block 214*d* is the area at the other end in the stacking direction.

The extended portions on the adjacent areas are extended by different lengths in the sliding direction between the first core block 214*a* and the second core block 214*b*, between the second core block 214*b* and the third core block 214*c*, and between the third core block 214*c* and the fourth core block 214*d*. In other words, the core blocks 214*a*, 214*b*, 214*c*, and 214*d* have extended portions of different shapes on the heads of the teeth 204. According to the embodiment, a length L1 of the first core block 214a along the direction A, a length L2 of the second core block 214b along the direction A, a length L3 of the third core block 214c in the direction A, and a length L4 of the fourth core block 214d in the direction A are set to be in a relationship of L1:L2:L3:L4=1:1:1:1; however, any other relationship may also be used.

As shown in FIG. 25, one side of the head of the tooth 214 is extended by a length A, and the other side is extended by a length B along the sliding direction in the first core block 214a; one side of the head of the tooth 214 is extended by a length E, and the other side is extended by a length F along the sliding direction in the second core block 214b; one side of the head of the tooth 214 is extended by a length G, and the other side is extended by a length H along the sliding direction in the third core block 214c; and one side of the head of the tooth 214 is extended by a length C, and the other side is extended by a length D along the sliding direction in the fourth core block 214d. In FIG. 25, the relationship of the lengths by which the one sides are extended is set to A>E>G>C, and that of the lengths by which the other sides are extended is set to B<F<H<D; however, alternatively, the relationship of the lengths by which the one sides are extended may be set to A<E<G<C, and that of the lengths by which the other sides are extended may be set to B>F>H>D.

These differences of the extended lengths converted into electric angles by way of the formulas (1) and (2) mentioned in the first embodiment are denoted as stepwise skew angles $\theta 1$ and $\theta 2$, respectively.

By setting the stepwise skew angles $\theta 1$ and $\theta 2$ to appropriate angles, the slot cogging thrust and the cogging thrust caused by the end effect of the rotor can be reduced simultaneously. According to the present embodiment, the same stepwise skew angle is provided to the head of each of the teeth 214 included in the armature core 212. According to the present embodiment, the second core block 214b and the third core block 214c are set to extend by the lengths E=(2×A+C)/3 and G=(A+2×C)/3, and F=(2×B+D)/3 and H=(B+2×D)/3, respectively, so that each of the lengths by which each of the core blocks 214a to 214d extends will be equal.

FIG. 26 indicates calculated theoretical effects of stepwise skew, calculated for each angle thereof. FIG. 26 indicates a ratio of a cogging component of each order, assuming that the cogging component is 1 when a stepwise skew angle is 0 degree, that is, with no stepwise skew (i.e., A=E=G=C and B=F=H=D). In the table shown in FIG. 26, the numbers with a negative sign indicates that the phase of a cogging waveform is reversed. By giving stepwise skew angles, the cogging component of each order can be reduced by the ratios shown in the table of FIG. 26, depending on the stepwise skew angle. As one may realize from the table shown in FIG. 26, by giving the four-stepwise skew structure to the heads of the teeth 214, the sixth- to sixteenth-order components of the cogging are greatly reduced, especially at the stepwise skew angle of 30 to 45 degrees, in comparison with the structure according to the first embodiment.

Upon deciding the stepwise skew angles, it is preferable to make the length A by which the one extended portion of the first core block 214a is extended in the sliding direction the same as the length D by which the other extended portion of the fourth core block 214d is extended in the sliding direction; and to make the length B by which the other extended portion of the first core block 214a is extended in the sliding direction the same as the length C by which the one extended portion of the fourth core block 214d is extended in the sliding direction. In the similar manner, it is preferable to make the length E by which the second core block 214b extends the same as the length H by which the third core block 214c extends; and to make the length F by which the second core block 214b extends the same as the length G by which the third core block 214c extends. In other words, it is preferable to set the lengths A to H so as to satisfy conditions A=D, B=C, E=H, and F=G. Because the shapes of the first core block 214a and the fourth core block 214d will be the same when the first core block 214a is reversed, and the shapes of the second core block 214b and the third core block 214c will be the same when the second core block 214b is reversed, such a structure allows parts to be shared, and therefore, the number of parts to be reduced.

As described above, the head of each of the teeth 214 is divided into the four core blocks 214a, 214b, 214c, and 214d; the extended portions on the head of each of the teeth 214 are formed to extend by different lengths; and the angles of stepwise skew are set to a desirable value. In this manner, the slot cogging thrust and the cogging thrust caused by the end effect of the rotor can be reduced simultaneously. Furthermore, the slot cogging thrust and the cogging thrust caused by the end effect of the rotor can be reduced even in an opposing type linear motor having the stator only on one lateral side.

Tenth Embodiment

Figure 27:
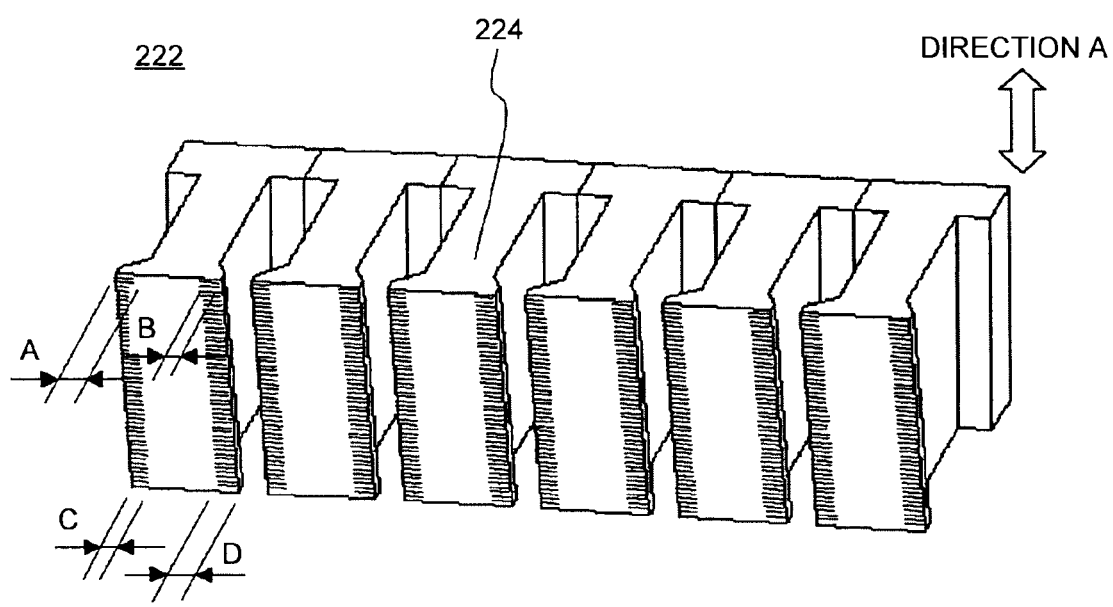
FIG. 27 is a perspective view of an armature core according to a tenth embodiment of the present invention.

FIG. 27 is a perspective view of an armature core according to a tenth embodiment of the present invention. The tenth embodiment is different from the first embodiment in that the head of each of the teeth is divided into a number of core blocks, and the armature core according to the tenth embodiment has a slanted skew structure in which both of the lateral sides of the head of each of the teeth facing the side of the rotor is slanted with respect to the direction A (stacking direction) that is perpendicular to the sliding direction of the rotor and in parallel with the pole face. In FIG. 27, an armature core 222 includes teeth 224. Extended portions that are extended in the sliding direction of the rotor are formed on the head of each of the teeth 224 that is divided into a number of core blocks that form a plurality of areas. The extended portions on adjacent core blocks, among a number of the core blocks, are extended by different lengths so that the contour line drawn by the extended portions on the heads of the teeth 224 becomes generally slanted with respect to the direction A. In other words, the ends of the heads of the teeth 224 in the sliding direction have a slanted skew structure that is slanted with respect to the direction A. If the armature core is to be manufactured with stacked steel plates, an armature core with a slanted skew structure can be obtained by gradually changing the length by which one or a few of the steel plates corresponding to a core block is extended, and stacking such steel plates.

As shown in FIG. 27, one end of the head of the tooth 224 in the direction A on one side of the head of the tooth 224 in the sliding direction is extended by a length A, and the other end of the head in the direction A is extended by a length C; and one end of the head of the tooth 224 in the direction A on the other side of the head of the tooth 224 in the sliding direction is extended by a length B, and the other end of the head in the direction A is extended by a length D. These differences in the extended lengths converted into electric angles by way of formulas (3) and (4) are herein denoted as slanted skew angles $\theta 1'$ and $\theta 2'$, respectively.

$$\theta 1' = (A-C) \times 180°/\tau \quad (3)$$

$$\theta 2' = (D-B) \times 180°/\tau \quad (4)$$

By setting the slanted skew angles $\theta 1'$ and $\theta 2'$ to appropriate angles, the slot cogging thrust and the cogging thrust caused by the end effect of the rotor can be reduced simultaneously. According to the present embodiment, the same slanted skew angle is provided to all of the heads of the teeth 224 included in the armature core 222.

FIG. 28 indicates calculated theoretical effects of a slanted skew, calculated for each angle thereof. FIG. 28 indicates a ratio of a cogging component of each order, assuming that the cogging component is 1 when a slanted skew angle is 0 degree, that is, with no slanted skew (i.e., when A=C and B=D). In the table shown in FIG. 28, the numbers with a negative sign indicates that the phase of a cogging waveform is reversed. By giving a slanted skew angle, the cogging component of each order can be reduced by the ratios shown in the table of FIG. 28, depending on the slanted skew angles. As one may realize from the table shown in FIG. 28, by giving the slanted skew structure to the heads of the teeth 224, the sixth- to sixteenth-order components of the cogging are reduced greatly, especially at the slanted skew angle of 30 to 45 degrees, in comparison with the structure according to the first embodiment.

As described above, the head of each of the teeth 224 is configured to have a slanted skew structure by way of a number of core blocks, and the angles thereof are set to a desirable value. In this manner, the slot cogging thrust and the cogging thrust caused by the end effect of the rotor can be reduced simultaneously. Furthermore, the slot cogging thrust and the cogging thrust caused by the end effect of the rotor can be reduced even in an opposing type linear motor having the stator only on one lateral side.

Eleventh Embodiment

Figure 29:
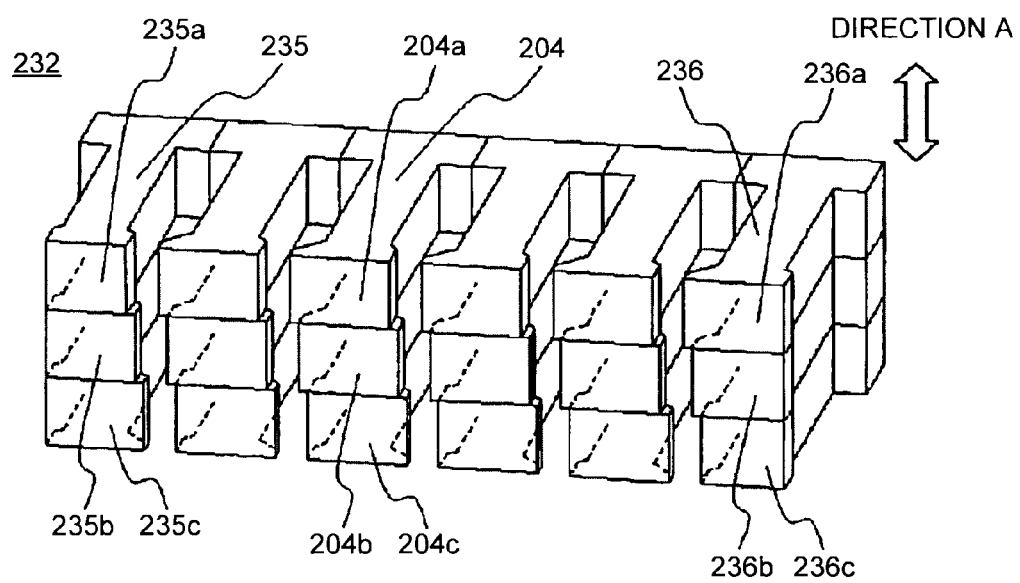
FIG. 29 is a perspective view of an armature core according to an eleventh embodiment of the present invention.

FIG. 29 is a perspective view of an armature core according to an eleventh embodiment of the present invention. The eleventh embodiment is different from the eighth embodiment in that only the outer side of the heads of the two teeth located at both ends in the sliding direction is provided with no stepwise skew.

In FIG. 29, an armature core 232 includes teeth 204, 235, and 236. Extended portions that are extended in the sliding direction of the rotor are formed on the head of each of the teeth 204, 235, and 236. The head of each of the teeth 204, 235, and 236 is configured to have a three-stepwise skew structure that is divided into three core blocks that form a plurality of areas along the direction A (stacking direction) that is perpendicular to the sliding direction of the rotor and in parallel with the pole face of the permanent magnets. The core blocks are referred to as first core blocks 204a, 235a, and 236a, second core blocks 204b, 235b, and 236b, and third core blocks 204c, 235c, and 236c. Excluding the two teeth 235 and 236 located at both ends of the armature core 232 along the sliding direction, each of the inner teeth 204 is formed with an extended portion on each end in the sliding direction, in the same manner as in the eighth embodiment, and has a three-stepwise skew structure.

An extended portion is provided on the inner side of the head of each of the teeth 235 and 236 (the side with an adjacent tooth) located at both ends, in the same manner as in the eighth embodiment; however, the outer side of the heads of the teeth 235 and 236 located at both ends have the same shape in each of the core blocks that form the adjacent areas in the direction A. In other words, at least one of the extended portions of the adjacent areas, that is, between the first core block 235a (236a) and the second core block 235b (236b), and between the second core block 235b (236b) and the third core block 235c (236c), is extended by a different length. Therefore, no extended portion is provided on the outer sides (the sides with no adjacent teeth) of the heads of the two teeth 235 and 236 located at both ends in the sliding direction, thus not configured to have a stepwise skew structure.

In this manner, by providing no stepwise skew only to the outer side of the two teeth 235 and 236 located at both ends in the sliding direction, the cogging thrust, especially the second-order component thereof, can be reduced, in comparison with the structure in which the same stepwise skew is provided to the heads of all of the teeth exactly in the same manner. Furthermore, by giving the three-stepwise skew structure to the heads of the teeth 204, 235, and 236, the sixth- to sixteenth-order components of the cogging are reduced greatly, especially at a stepwise skew angle of approximately 30 degrees, in comparison with the structure according to the second embodiment.

According to the present embodiment, the heads of the teeth are provided with the three-stepwise skew structure; however, the heads of the teeth may also be provided with a four-stepwise skew structure disclosed in the ninth embodiment, or a slanted skew structure disclosed in the tenth structure, and the outer side of the heads of two teeth located at both ends in the sliding direction (the side with no adjacent tooth) are provided with no skew structure. By way of such a structure, the sixth- to sixteenth-order components of the cogging can be further reduced at a stepwise skew angle of 30 to 45 degrees.

Twelfth Embodiment

Figure 30:
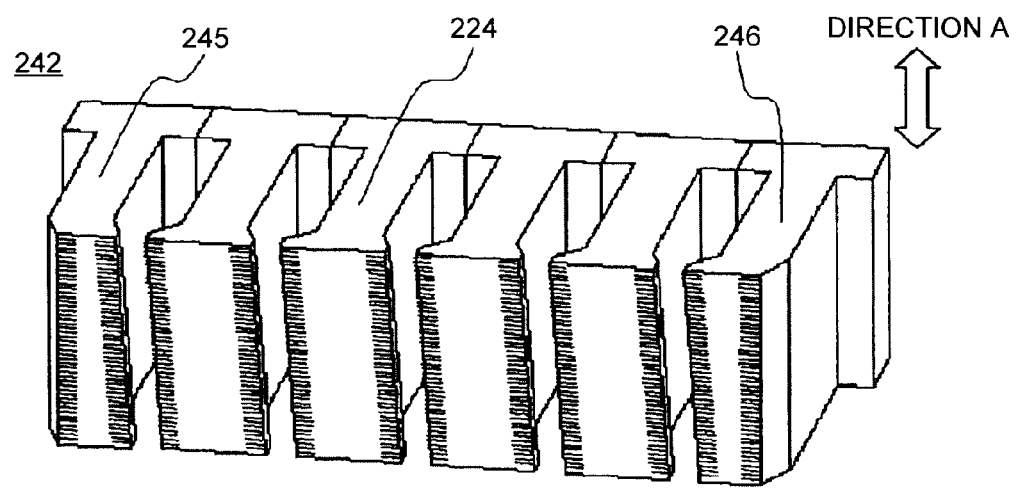
FIG. 30 is a perspective view of an armature core according to a twelfth embodiment of the present invention.

FIG. 30 is a perspective view of an armature core according to a twelfth embodiment of the present invention. The twelfth embodiment is different from the tenth embodiment in that no stepwise skew is provided only on the outer side of the heads of the two teeth located at both ends in the sliding direction, and the extended portion is formed with a cutout that is a negative protrusion.

In FIG. 30, an armature core 242 includes teeth 224, 245, and 246. The head of each of the teeth 224, 245, and 246 is divided into a number of core blocks that form a plurality of areas. Extended portions that are extended in the sliding direction of the rotor are formed at the head of each of the teeth 224, 245, and 246. The extended portions on adjacent core blocks, among a number of the core blocks, are extended by different lengths so that the contour line drawn by the extended portions on the heads of the teeth 224, 245, and 246 becomes generally slanted with respect to the direction A. In other words, the ends of the heads of the teeth 224, 245, and 246 (only the inner side for the teeth 245 and 246) have a slanted skew structure that is slanted with respect to the direction A (stacking direction) that is perpendicular to the sliding direction of the rotor and in parallel with the pole face. If the armature core is to be manufactured with stacked steel plates, an armature core with a slanted skew structure can be obtained by gradually changing the length by which one or a few of the steel plates corresponding to a core block is extended, and stacking such steel plates.

The inner extended portions on the heads of the teeth 245 and 246 (the side with an adjacent tooth) located at both ends have a slanted skew structure, in the same manner as disclosed in the tenth embodiment. On the contrary, no extended portion is provided on the outer side of the heads of the teeth 245 and 246 (the side with no adjacent tooth) located at both ends, and, the corners thereof are cut out by a fixed amount.

In this manner, by providing no skew structure only to the outer side of the heads of the two teeth 245 and 246 located at both ends in the sliding direction, and by cutting out the extended portion thereon, the cogging thrust, especially the second-order component thereof, can be reduced, in comparison with the structure in which a stepwise skew is provided to the heads of all of the teeth exactly in the same manner.

Furthermore, the sixth- to sixteenth-order components of the cogging are reduced greatly, especially at a slanted skew angle of 30 to 45 degrees.

According to the present embodiment, the slanted skew structure is provided to the heads of the teeth; however, alternatively, a three-stepwise skew structure, disclosed in the eighth embodiment, or a four-stepwise skew structure, disclosed in the ninth structure, may be provided to the heads of the teeth, without giving the skew structure to the outer side of the heads of two teeth located at both ends in the sliding direction (the side with no adjacent tooth), and the extended portions thereon may be cut out.

Thirteenth Embodiment

Figure 31:
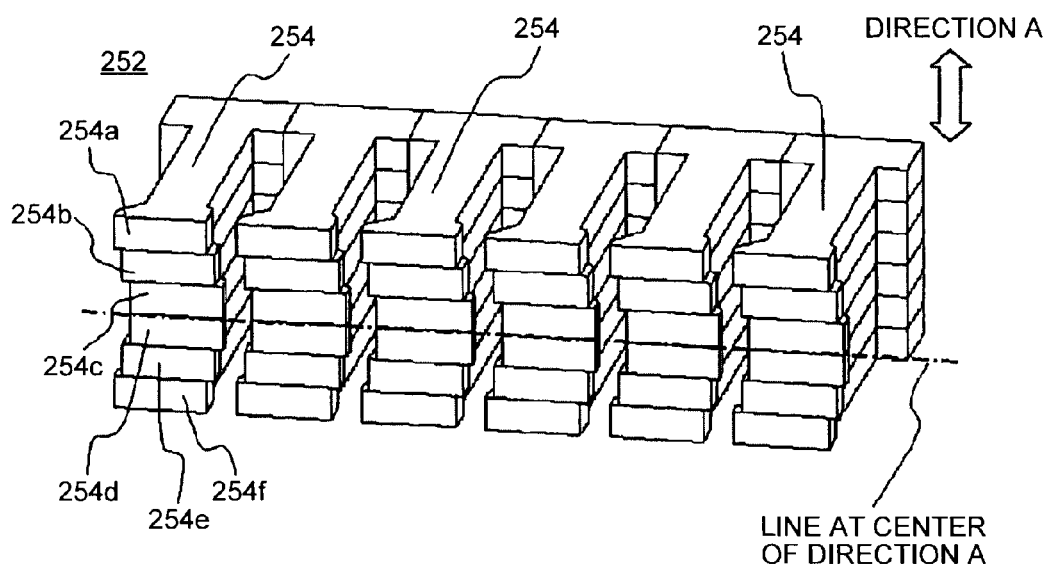
FIG. 31 is a perspective view of an armature core according to a thirteenth embodiment of the present invention.

FIG. 31 is a perspective view of an armature core according to a thirteenth embodiment of the present invention. The thirteenth embodiment is different from the sixth embodiment in that the head of each of the teeth is divided into six core blocks. In FIG. 31, an armature core 252 includes teeth 254. Extended portions that are extended in the sliding direction of the rotor are formed on the head of each of the teeth 254. The head of each of the teeth 254 is divided into six core blocks, that is a first core block 254a, a second core block 254b, a third core block 254c, a fourth core block 254d, a fifth core block 254e, and a sixth core block 254f along the direction A (stacking direction) that is perpendicular to the sliding direction of the rotor and in parallel with the pole face.

When viewed from the direction in perpendicular to the pole face, each of the core blocks 254a to 254f is arranged so as to form a linear symmetry along a center line running in the sliding direction and passing through a center of two ends of the head of each of the teeth 254 in the direction A (a line at the center of the direction A). In other words, the first core block 254a and the sixth core block 254f, the second core block 254b and the fifth core block 254e, and the third core block 254c and the fourth core block 254d are arranged to be in a liner symmetry along the line at the center of the direction A.

By dividing the head of each of the teeth 254 into the six core blocks so as to form a linear symmetry with respect to the line at the center of the direction A, the magnetic attractions generated between each of the six core blocks and each of the permanent magnets of the stator are cancelled out by each other, when viewed from the center of the entire six core blocks, as disclosed in the sixth embodiment. Therefore, no rotating force is communicated to the linear guide, thus reducing vibrations and noises of the rotor. Furthermore, because the number of steps in the stepwise skew is increased in comparison with that of the sixth embodiment, the sixth- to sixteenth-order components of the cogging are reduced at an angle of approximately 30 degrees, thus allowing the slot cogging thrust and the cogging thrust caused by the end effect of the rotor to be reduced simultaneously.

Figure 32:
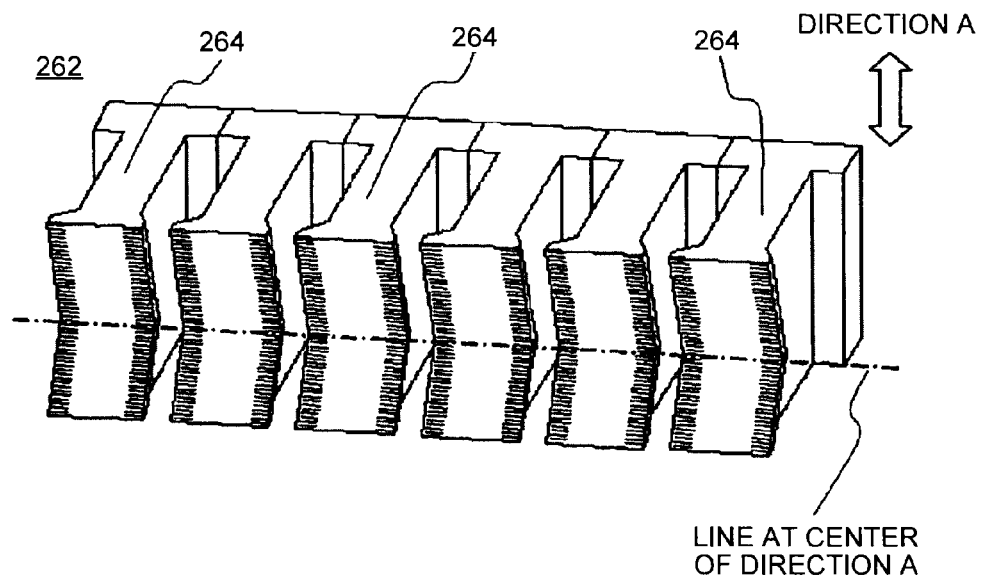
FIG. 32 is a perspective view of another armature core according to the thirteenth embodiment of the present invention.

According to the present embodiment, a six-stepwise skew structure is provided to the head of each of the teeth; however, alternatively, a stepwise skew structure having more steps may be provided to the head of each of the teeth, as long as the heads of the teeth are arranged in a linear symmetry along the line at the center of the direction A. Furthermore, a slanted skew structure may be also provided to the head of each of teeth 264 included in an armature core 262, as shown in FIG. 32, in a linear symmetry along the line at the center of the direction A. In FIG. 32, the contour line drawn by the extended portions on the heads of the teeth 264 is generally slanted with respect to the direction A, and is in liner symmetry along the line at the center of the direction A. By providing such a structure, the sixth- to sixteenth-order components of the cogging are further reduced at a stepwise skew angle of 30 to 45 degrees.

Figure 33:
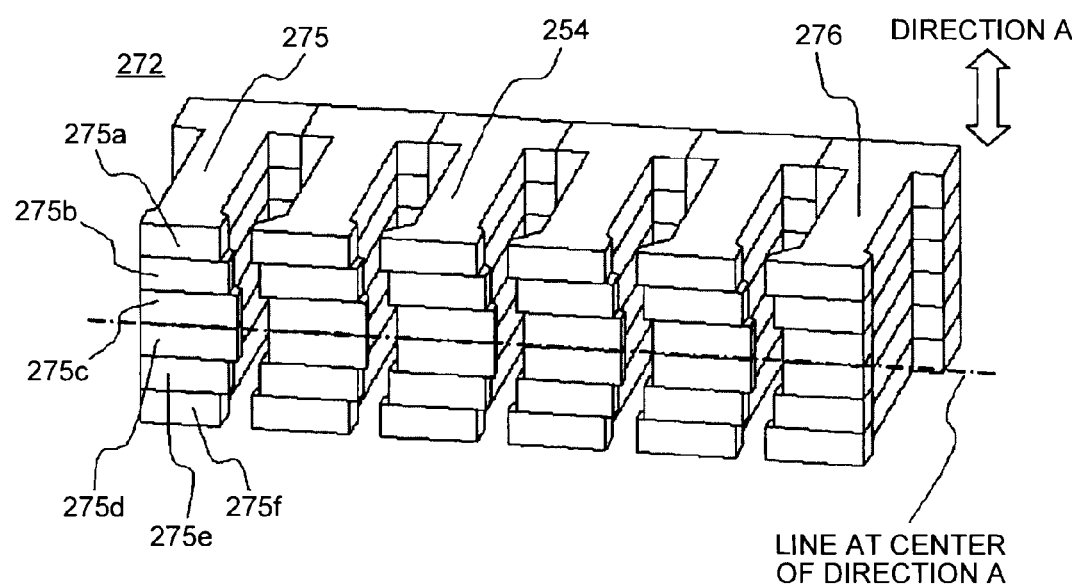
FIG. 33 is a perspective view of still another armature core according to the thirteenth embodiment of the present invention.

According to the present embodiment, the armature core has a structure in which all of the teeth has a head thereof formed in the same manner; however, only the outer side of the heads of the two teeth located at both ends in the sliding direction may be provided with no stepwise skew, as explained in the eleventh embodiment. FIG. 33 is a perspective view of an armature core 272 having a six-stepwise skew structure, in which no stepwise skew is provided only to the outer side of the heads of the two teeth 275 and 276 located at both ends in the sliding direction. By providing such a structure, the cogging thrust, especially the second-order component thereof, can be reduced, in comparison with the structure in which a stepwise skew is provided to the heads of all of the teeth exactly in the same manner.

Figure 34:
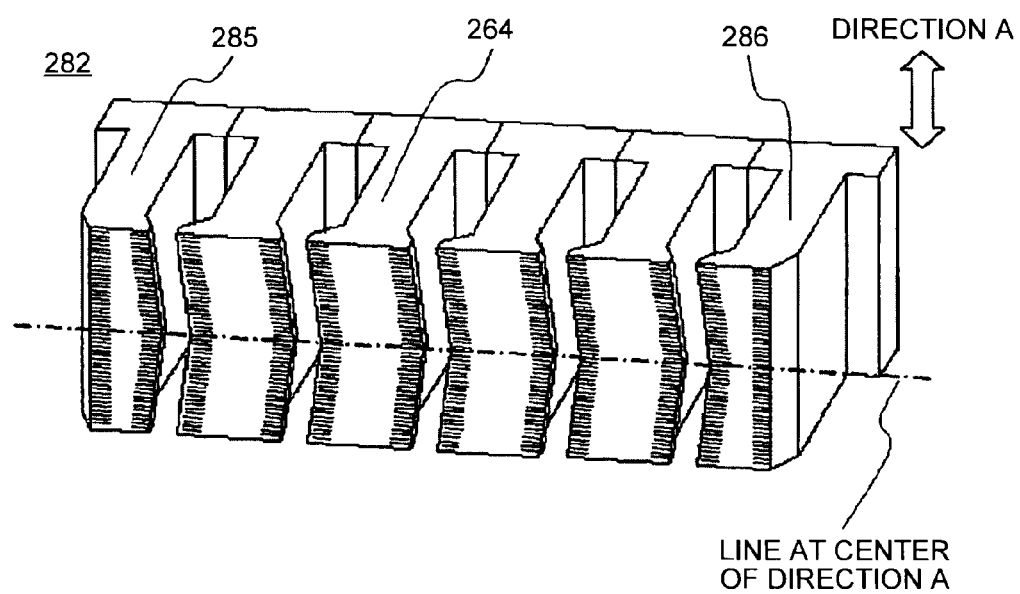
FIG. 34 is a perspective view of still another armature core according to the thirteenth embodiment of the present invention.

Furthermore, only the outer side of the heads of the two teeth located at both ends in the sliding direction may not be provided with a stepwise skew, and the shape of the extended portions thereon may be formed with a cutout that is a negative protrusion, as explained in the twelfth embodiment. FIG. 34 is a perspective view of an armature core 282 having a slanted skew structure, in which only the extended portions on the outer side of the heads of the two teeth located at both ends in the sliding direction have a cutout. Such a structure enables the cogging thrust, especially the second-order component thereof, to be reduced, in comparison with the structure in which a skew is provided to the heads of all of the teeth exactly in the same manner.

Figure 35:
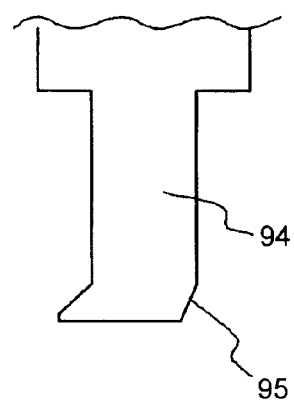
FIG. 35 is a sectional view of the head of a tooth according to the embodiment of the present invention, having an extended portion that is a cutout.

According to the first to the eleventh embodiments, the extended portions provided on the head of each of the teeth are exemplarily shown as positive protrusions; however, the same effects can be achieved by providing the extended portions on the heads of teeth 94 in the shape of a cutout 95 that is a negative protrusion, in the manner shown in FIG. 35. For example, a part of the outer side of the heads of the teeth located at both ends of the armature core in the sliding direction may be cut out, and a cutout of the same shape can be provided to the adjacent core blocks.

Furthermore, in the examples explained in all of these embodiments, a four-pole and six-toothed structure is used; however, the present invention may also be applied to any combination of the numbers of poles and teeth.

Figure 36:
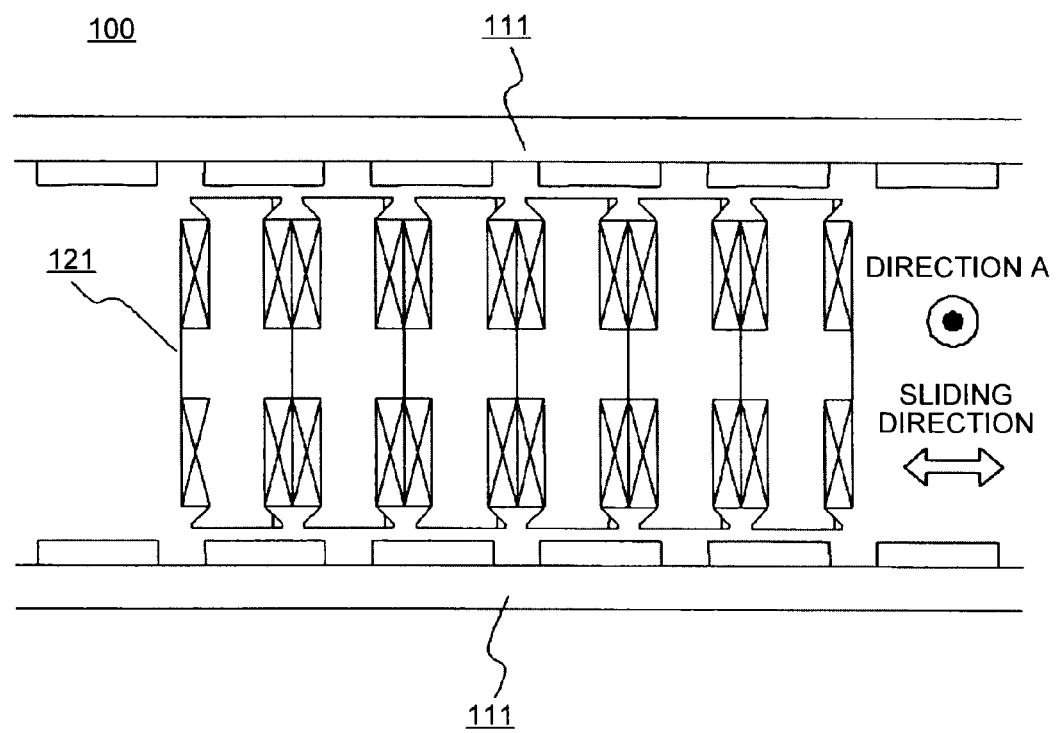
FIG. 36 is a sectional view of an offsetting-type linear motor to which the present invention is applied.

Furthermore, an opposing type linear motor in which the pole face of the permanent magnets are formed on one plane, is used herein as an example; however, the present invention may also be applied to an offsetting-type linear motor 100 that includes stators 111 on both sides of a rotor 121, and having two pole face planes, such as one shown in FIG. 36.

The invention claimed is:

1. A linear motor comprising:
a stator having a plurality of field poles arranged linearly with opposing polarities thereof arranged in an alternating manner; and
a rotor having an armature core with a plurality of teeth that faces a pole face of the field poles with a predetermined gap therebetween, and coils wound around the teeth,
wherein the stator and the rotor are supported in a slidable manner, a direction perpendicular to a sliding direction of the rotor and in parallel with the pole face is defined as a stacking direction, a head of each of the teeth has an extended portion that is extended in both a first and a second, opposite direction parallel to the sliding direction, at least heads of the teeth arranged at both ends of the armature core along the sliding direction is divided into a plurality of areas along the stacking direction, and at least one of extended portions in the first direction is extended by a different length along the sliding direction than an extended portion in the second direction on a first tooth, a second tooth adjacent to the first tooth in the stacking direction has an extended portion in the first direction with a different length along the sliding direction than an extended portion in the second direction, a first stepwise skew angle between the first and second tooth is equal to $(A-C)\times 180°/\tau$ and a second stepwise skew angle between the first and second tooth is equal to $(B-D)\times 180°/\tau$, where A is a length of the extended portion of the first tooth in the first direction, B is a length of the extended portion of the first tooth in the second direction, C is a length of the extended portion of the second tooth in the first direction, D is a length of the extended portion of the second tooth in the second direction, and $\tau$ is the distance between the field poles of the stator, and the first stepwise skew angle and the second stepwise skew angle are non-zero and equal to each other.

2. The linear motor according to claim 1, wherein a head of each of the teeth excluding those arranged at both ends of the armature core along the sliding direction is divided into a plurality of areas along the stacking direction, and at least one of the extended portions arranged on the adjacent areas is extended by a different length along the sliding direction.

3. The linear motor according to claim 1, wherein the extended portions arranged on the adjacent areas are extended by different lengths in front and behind along the sliding direction.

4. The linear motor according to claim 1, wherein an extended portion in an area at one end of the areas in the stacking direction and on one side in the sliding direction is extended by a same length as an extended portion in another area at the other end of the areas in the stacking direction and on the other side in the sliding direction, and an extended portion in an area at the one end of the areas in the stacking direction and on the other side in the sliding direction is extended by a same length as an extended portion in another area at the other end of the areas in the stacking direction and on the one side in the sliding direction.

5. The linear motor according to claim 1, wherein inner extended portions provided on the heads of the teeth located at both ends of the armature core in the sliding direction are extended by different lengths in at least one of the areas, with respect to the outer extended portions provided on the heads of the teeth located at both ends of the armature core in the sliding direction, and extended portions provided on the heads of the teeth located at positions other than both ends of the armature core in the sliding direction.

6. The linear motor according to claim 1, wherein the inner extended portions provided on the heads of the teeth located at both ends of the armature core in the sliding direction are extended by different lengths at least in one of the areas, with respect to the extended portions provided on the heads of the teeth located at positions other than both ends of the armature core in the sliding direction, and an outer side of the heads of the teeth located at both ends of the armature core in the sliding direction has a part that is cut out, and a shape of the cutout is made same in the adjacent areas.

7. The linear motor according to claim 1, wherein the inner extended portions provided on the heads of the teeth located at both ends of the armature core in the sliding direction are extended by different lengths in the adjacent areas.

8. The linear motor according to claim 1, wherein a contour line drawn by the extended portions provided on the heads of the teeth is generally slanted with respect to the stacking direction.

9. A linear motor comprising:
a stator having a plurality of field poles arranged linearly with opposing polarities thereof arranged in an alternating manner; and
a rotor having an armature core with a plurality of teeth that faces a pole face of the field poles with a predetermined gap therebetween, and coils wound around the teeth,
wherein the stator and the rotor are supported in a slidable manner, a direction perpendicular to a sliding direction of the rotor and in parallel with the pole face is defined as a stacking direction, a head of each of the teeth has an extended portion that is extended in the sliding direction, at least heads of the teeth arranged at both ends of the armature core along the sliding direction is divided into a plurality of areas along the stacking direction, at least one of extended portions arranged on adjacent areas is extended by a different length along the sliding direction, and outer extended portions provided on the heads of the teeth located at both ends of the armature core in the sliding direction are extended by a same length in the adjacent areas.

10. The linear motor according to claim 9, wherein the inner extended portions provided on the heads of the teeth located at both ends of the armature core in the sliding direction are extended by different lengths with respect to the extended portions provided on the heads of the teeth located at positions other than both ends of the armature core in the sliding direction at least one area out of the plurality of areas.

* * * * *